(12) United States Patent
Gopal et al.

(10) Patent No.: US 12,193,047 B2
(45) Date of Patent: Jan. 7, 2025

(54) TECHNIQUES FOR PROTECTING RADIO FREQUENCY FRONT-END COMPONENTS

(71) Applicant: QUALCOMM Incorporated, San Diego, CA (US)

(72) Inventors: Thawatt Gopal, San Diego, CA (US); Qingxin Chen, San Diego, CA (US); Cheol Hee Park, San Diego, CA (US); Reza Shahidi, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/657,025

(22) Filed: Mar. 29, 2022

(65) Prior Publication Data
US 2022/0322374 A1    Oct. 6, 2022

Related U.S. Application Data

(60) Provisional application No. 63/168,174, filed on Mar. 30, 2021.

(51) Int. Cl.
*H04W 76/15*  (2018.01)
*H04B 1/44*   (2006.01)
*H04W 72/566* (2023.01)

(52) U.S. Cl.
CPC ............ *H04W 72/569* (2023.01); *H04B 1/44* (2013.01); *H04W 76/15* (2018.02)

(58) Field of Classification Search
CPC ....... H04W 72/569; H04W 76/15; H04B 1/44
USPC .......................................................... 455/78
See application file for complete search history.

(56) References Cited

U.S. PATENT DOCUMENTS

| | | | |
|---|---|---|---|
| 6,643,522 B1 * | 11/2003 | Young ................... | H04B 1/406 |
| | | | 455/552.1 |
| 9,215,546 B2 * | 12/2015 | Khorami ................. | H04B 1/18 |
| 9,485,078 B2 * | 11/2016 | Khorami ............. | H04B 1/0458 |

(Continued)

FOREIGN PATENT DOCUMENTS

| EP | 3344000 A1 | 7/2018 |
|---|---|---|
| WO | WO-2021076580 A1 | 4/2021 |
| WO | WO-2021252175 A1 | 12/2021 |

OTHER PUBLICATIONS

International Search Report and Written Opinion—PCT/US2022/071443—ISA/EPO—Jul. 5, 2022.

*Primary Examiner* — April G Gonzales
(74) *Attorney, Agent, or Firm* — Dalei Dong; Harrity & Harrity, LLP

(57) ABSTRACT

The present disclosure relates to methods, devices and software that can be used for preventing damage to RF front end equipment used in wireless communication systems. In some aspects, a user equipment (UE) may establish a first communication having a first priority, wherein the first communication is associated with a first subscriber in a connected mode. The UE may establish a second communication having a second priority, wherein the second communication is associated with a second subscriber in the connected mode. The UE may identify a state of a transmit/receive (TRX) switch shared between the first communication and the second communication. The UE may perform, based at least in part on the state of the TRX switch, at least one of the first communication or the second communication using a TRX switching configuration.

26 Claims, 15 Drawing Sheets

(56) References Cited

U.S. PATENT DOCUMENTS

| | | | |
|---|---|---|---|
| 2010/0316027 A1* | 12/2010 | Rick | H04B 1/406 |
| | | | 370/336 |
| 2015/0181363 A1* | 6/2015 | Khorami | H04B 1/0458 |
| | | | 370/297 |
| 2015/0282057 A1* | 10/2015 | Li | H04B 7/0871 |
| | | | 455/552.1 |
| 2016/0248576 A1* | 8/2016 | Khorami | H04B 1/18 |
| 2019/0097715 A1* | 3/2019 | Maldonado | H04B 7/0814 |
| 2020/0084814 A1* | 3/2020 | Lindoff | H04W 64/00 |
| 2020/0162121 A1* | 5/2020 | Doyle | H04B 1/18 |

* cited by examiner

TECHNIQUES FOR PROTECTING RADIO FREQUENCY FRONT-END COMPONENTS

CROSS-REFERENCE TO RELATED APPLICATION

This patent application claims priority to U.S. Provisional Patent Application No. 63/168,174, filed on Mar. 30, 2021, entitled "TECHNIQUES FOR PROTECTING RADIO FREQUENCY FRONT-END COMPONENTS," and assigned to the assignee hereof. The disclosure of the prior application is considered part of and is incorporated by reference into this patent application.

FIELD OF THE DISCLOSURE

The present disclosure relates to techniques and apparatuses for protecting radio frequency front-end (RFFE) components used for wireless communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP). The 3GPP also promulgates wireless communication specifications relating to 5G New Radio (NR) communications.

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), an NR BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing a first communication having a first priority, wherein the first communication is associated with a first subscriber in a connected mode; establishing a second communication having a second priority, wherein the second communication is associated with a second subscriber in the connected mode; identifying a state of a transmit/receive (TRX) switch shared between the first communication and the second communication; and performing, based at least in part on the state of the TRX switch, at least one of the first communication or the second communication using a TRX switching configuration.

In some aspects, the first priority is higher than the second priority, the first communication is a transmission and is ongoing, and the performance of at least one of the first communication or the second communication further comprises: preventing the TRX switch from switching to a state associated with the second communication.

In some aspects, the first priority is higher than the second priority, the first communication is a reception and is ongoing, and the performance of at least one of the first communication or the second communication further comprises: preventing the TRX switch from switching to a state associated with the second communication.

In some aspects, the first priority is higher than the second priority, the second communication is a transmission and is ongoing, and the performance of at least one of the first communication or the second communication further comprises: blanking the second communication; switching the TRX switch to a state associated with the first communication; and performing the first communication.

In some aspects, the first priority is higher than the second priority, the second communication is a reception and is ongoing, and the performance of at least one of the first communication or the second communication further comprises: blanking the second communication; switching the TRX switch to a state associated with the first communication; and performing the first communication.

In some aspects, the first priority is higher than the second priority, and the performance of at least one of the first communication or the second communication further comprises: blanking or postponing the second communication in a slot, wherein the first communication is scheduled for the slot; and performing the first communication in the slot.

In some aspects, the identification of the state of the TRX switch further comprises: identifying that the TRX switch is shared between the first communication and the second communication based at least in part on the first communication and the second communication being associated with a same power amplifier.

In some aspects, the TRX switch is associated with switching a front-end antenna path of the UE between the first subscriber and the second subscriber.

In some aspects, a method of wireless communication performed by a UE includes establishing a first communication associated with a first priority, wherein the first communication is associated with a first subscriber in a connected mode and is ongoing; establishing a second communication associated with a second priority, wherein the second communication is associated with a second subscriber in the connected mode, and wherein the second communication at least partially overlaps the first communication in time; identifying a low noise amplifier (LNA) shared between the first communication and the second communication; and performing at least one of the first communication or the second communication using an LNA configuration associated with the LNA being shared.

In some aspects, the first communication is a transmission and the first priority is higher than the second priority, and performance of at least one of the first communication or the second communication further comprises: blanking the second communication.

In some aspects, blanking the second communication further comprises triggering a power amplifier or a digital-analog converter of the second communication to blank the second communication.

In some aspects, the first communication is a transmission and the first priority is higher than the second priority, and the performance of at least one of the first communication or the second communication further comprises: performing at least one of the first communication or the second communication with an input of the LNA terminated at a threshold resistance load.

In some aspects, the first communication is a transmission and the first priority is higher than the second priority, and the performance of at least one of the first communication or the second communication further comprises: performing at least one of the first communication or the second communication using a high impedance mode at the LNA.

In some aspects, the first communication is a transmission and the first priority is higher than the second priority, and the performance of at least one of the first communication or the second communication further comprises: performing at least one of the first communication or the second communication with the LNA terminated to ground.

In some aspects, a method of wireless communication performed by a UE includes establishing a first communication associated with a first priority, wherein the first communication is associated with a first subscriber in a connected mode and is ongoing; establishing a second communication associated with a second priority, wherein the second communication is associated with a second subscriber in the connected mode, wherein the first priority is higher than the second priority; identifying a cross-switch shared between the first subscriber and the second subscriber; identifying a switch request of the cross-switch; and processing the switch request based at least in part on which subscriber, of the first subscriber and the second subscriber, triggered the switch request.

In some aspects, the switch request is triggered by the first subscriber, and processing the switch request further comprises: switching the cross-switch in accordance with the switch request; and blanking the second communication.

In some aspects, the switch request is associated with an antenna-switched diversity configuration.

In some aspects, the switch request is associated with a sounding reference signal antenna switching configuration.

In some aspects, the switch request is triggered by the second subscriber, and processing the switch request further comprises: postponing a switch of the cross-switch until the first communication is completed; and performing the switch after the first communication is completed.

In some aspects, the switch request is triggered by the second subscriber, and processing the switch request further comprises: canceling a switch of the cross-switch based at least in part on the switch impacting the first communication.

In some aspects, the switch request is triggered by the second subscriber, and processing the switch request further comprises: performing a switch of the cross-switch based at least in part on a determination that the switch can be performed without impacting the first communication.

In some aspects, a method of wireless communication performed by a UE includes establishing a first communication associated with a first priority, wherein the first communication is associated with a first subscriber in a connected mode; establishing a second communication associated with a second priority, wherein the second communication is associated with a second subscriber in the connected mode; identifying a state of one or more components shared between the first communication and the second communication, wherein the one or more components include at least one of: a transmit/receive switch, a low noise amplifier, or a cross-switch; and performing at least one of the first communication or the second communication using a configuration to prevent damage to one or more components of the UE based at least in part on the one or more components being shared between the first communication and the second communication.

In some aspects, a UE for wireless communication includes a memory; and one or more processors, coupled to the memory, configured to: establish a first communication having a first priority, wherein the first communication is associated with a first subscriber in a connected mode; establish a second communication having a second priority, wherein the second communication is associated with a second subscriber in the connected mode; identify a state of a TRX switch shared between the first communication and the second communication; and perform, based at least in part on the state of the TRX switch, at least one of the first communication or the second communication using a TRX switching configuration.

In some aspects, a UE for wireless communication includes a memory; and one or more processors, coupled to the memory, configured to: establish a first communication associated with a first priority, wherein the first communication is associated with a first subscriber in a connected mode and is ongoing; establish a second communication associated with a second priority, wherein the second communication is associated with a second subscriber in the connected mode, and wherein the second communication at least partially overlaps the first communication in time; identify an LNA shared between the first communication and the second communication; and perform at least one of the first communication or the second communication using an LNA configuration associated with the LNA being shared.

In some aspects, a UE for wireless communication includes a memory; and one or more processors, coupled to the memory, configured to: establish a first communication associated with a first priority, wherein the first communication is associated with a first subscriber in a connected mode and is ongoing; establish a second communication associated with a second priority, wherein the second communication is associated with a second subscriber in the connected mode, wherein the first priority is higher than the second priority; identify a cross-switch shared between the first subscriber and the second subscriber; identify a switch request of the cross-switch; and process the switch request based at least in part on which subscriber, of the first subscriber and the second subscriber, triggered the switch request.

In some aspects, a UE for wireless communication includes a memory; and one or more processors, coupled to the memory, configured to: establish a first communication associated with a first priority, wherein the first communication is associated with a first subscriber in a connected mode; establish a second communication associated with a second priority, wherein the second communication is associated with a second subscriber in the connected mode; identify a state of one or more components shared between the first communication and the second communication, wherein the one or more components include at least one of: a transmit/receive switch, a low noise amplifier, or a cross-switch; and perform at least one of the first communication or the second communication using a configuration to prevent damage to one or more components of the UE based at least in part on the one or more components being shared between the first communication and the second communication.

In some aspects, a non-transitory computer-readable medium storing a set of instructions for wireless communication includes one or more instructions that, when executed by one or more processors of a UE, cause the UE to: establish a first communication having a first priority, wherein the first communication is associated with a first subscriber in a connected mode; establish a second communication having a second priority, wherein the second communication is associated with a second subscriber in the connected mode; identify a state of a TRX switch shared between the first communication and the second communication; and perform, based at least in part on the state of the TRX switch, at least one of the first communication or the second communication using a TRX switching configuration.

In some aspects, a non-transitory computer-readable medium storing a set of instructions for wireless communication includes one or more instructions that, when executed by one or more processors of a UE, cause the UE to: establish a first communication associated with a first priority, wherein the first communication is associated with a first subscriber in a connected mode and is ongoing; establish a second communication associated with a second priority, wherein the second communication is associated with a second subscriber in the connected mode, and wherein the second communication at least partially overlaps the first communication in time; identify an LNA shared between the first communication and the second communication; and perform at least one of the first communication or the second communication using an LNA configuration associated with the LNA being shared.

In some aspects, a non-transitory computer-readable medium storing a set of instructions for wireless communication includes one or more instructions that, when executed by one or more processors of a UE, cause the UE to: establish a first communication associated with a first priority, wherein the first communication is associated with a first subscriber in a connected mode and is ongoing; establish a second communication associated with a second priority, wherein the second communication is associated with a second subscriber in the connected mode, wherein the first priority is higher than the second priority; identify a cross-switch shared between the first subscriber and the second subscriber; identify a switch request of the cross-switch; and process the switch request based at least in part on which subscriber, of the first subscriber and the second subscriber, triggered the switch request.

In some aspects, a non-transitory computer-readable medium storing a set of instructions for wireless communication includes one or more instructions that, when executed by one or more processors of a UE, cause the UE to: establish a first communication associated with a first priority, wherein the first communication is associated with a first subscriber in a connected mode; establish a second communication associated with a second priority, wherein the second communication is associated with a second subscriber in the connected mode; identify a state of one or more components shared between the first communication and the second communication, wherein the one or more components include at least one of: a transmit/receive switch, a low noise amplifier, or a cross-switch; and perform at least one of the first communication or the second communication using a configuration to prevent damage to one or more components of the UE based at least in part on the one or more components being shared between the first communication and the second communication.

In some aspects, an apparatus for wireless communication includes means for establishing a first communication having a first priority, wherein the first communication is associated with a first subscriber in a connected mode; means for establishing a second communication having a second priority, wherein the second communication is associated with a second subscriber in the connected mode; means for identifying a state of a TRX switch shared between the first communication and the second communication; and means for performing, based at least in part on the state of the TRX switch, at least one of the first communication or the second communication using a TRX switching configuration.

In some aspects, an apparatus for wireless communication includes means for establishing a first communication associated with a first priority, wherein the first communication is associated with a first subscriber in a connected mode and is ongoing; means for establishing a second communication associated with a second priority, wherein the second communication is associated with a second subscriber in the connected mode, and wherein the second communication at least partially overlaps the first communication in time; means for identifying an LNA shared between the first communication and the second communication; and means for performing at least one of the first communication or the second communication using an LNA configuration associated with the LNA being shared.

In some aspects, an apparatus for wireless communication includes means for establishing a first communication associated with a first priority, wherein the first communication is associated with a first subscriber in a connected mode and is ongoing; means for establishing a second communication associated with a second priority, wherein the second communication is associated with a second subscriber in the connected mode, wherein the first priority is higher than the second priority; means for identifying a cross-switch shared between the first subscriber and the second subscriber; means for identifying a switch request of the cross-switch; and means for processing the switch request based at least in part on which subscriber, of the first subscriber and the second subscriber, triggered the switch request.

In some aspects, an apparatus for wireless communication includes means for establishing a first communication associated with a first priority, wherein the first communication is associated with a first subscriber in a connected mode; means for establishing a second communication associated with a second priority, wherein the second communication is associated with a second subscriber in the connected mode; means for identifying a state of one or more components shared between the first communication and the second communication, wherein the one or more components include at least one of: a transmit/receive switch, a low noise amplifier, or a cross-switch; and means for performing at least one of the first communication or the second communication using a configuration to prevent damage to one or more components of the UE based at least in part on the one or more components being shared between the first communication and the second communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G NR radio access technology (RAT), aspects of the present disclosure can be applied to other RATs, such as a 3G RAT, a 4G RAT, and/or a RAT subsequent to 5G (e.g., 6G).

Figure 1:
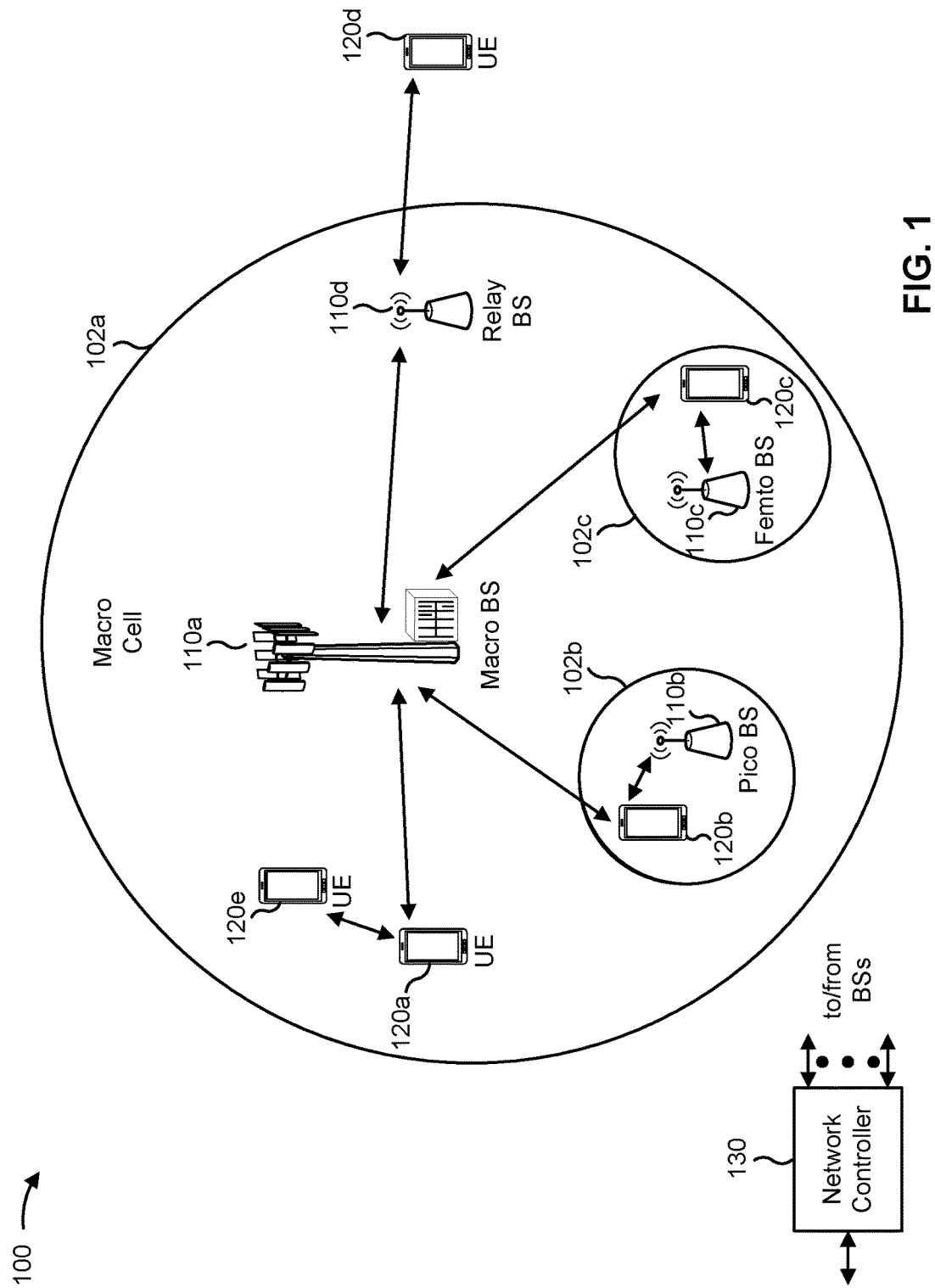
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
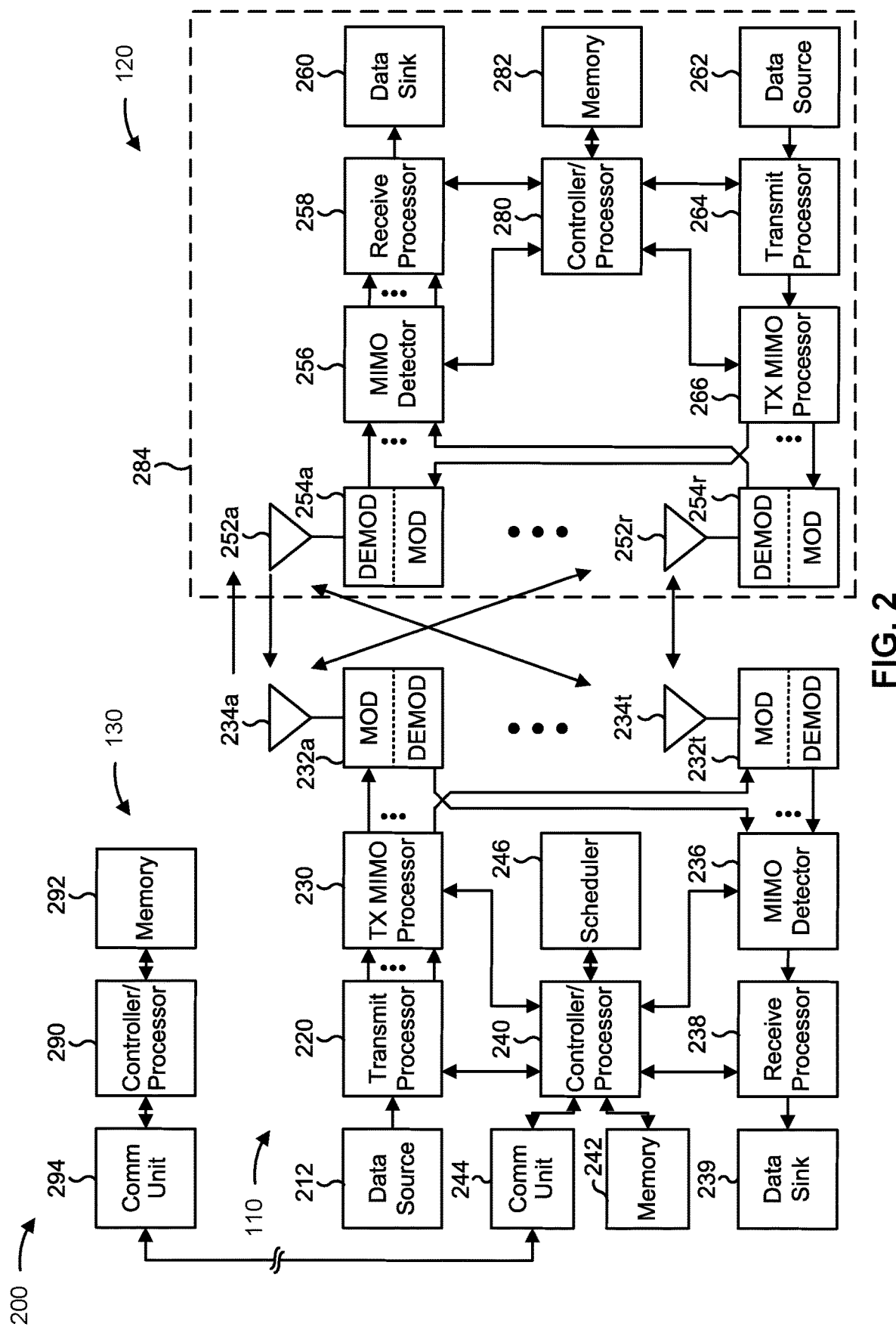
FIG. 2 is a diagram illustrating an example of a base station (BS) in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with RFFE shared component protection, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions.

In some aspects, the UE includes means for establishing a first communication having a first priority, wherein the first communication is associated with a first subscriber in a connected mode; means for establishing a second communication having a second priority, wherein the second communication is associated with a second subscriber in the connected mode; means for identifying a state of a transmit/receive (TRX) switch shared between the first communication and the second communication; or means for performing, based at least in part on the state of the TRX switch, at least one of the first communication or the second communication using a TRX switching configuration. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for establishing a first communication associated with a first priority, wherein the first communication is associated with a first subscriber in a connected mode and is ongoing; means for establishing a second communication associated with a second priority, wherein the second communication is associated with a second subscriber in the connected mode, and wherein the second communication at least partially overlaps the first communication in time; means for identifying a low noise amplifier (LNA) shared between the first communication and the second communication; or means for performing at least one of the first communication or the second communication using an LNA configuration associated with the LNA being shared. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for establishing a first communication associated with a first priority, wherein the first communication is associated with a first subscriber in a connected mode and is ongoing; means for establishing a second communication associated with a second priority, wherein the second communication is associated with a second subscriber in the connected mode, wherein the first priority is higher than the second priority; means for identifying a cross-switch shared between the first subscriber and the second subscriber; means for identifying a switch request of the cross-switch; or means for processing the switch request based at least in part on which subscriber, of the first subscriber and the second subscriber, triggered the switch request. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for establishing a first communication associated with a first priority, wherein the first communication is associated with a first subscriber in a connected mode; means for establishing a second communication associated with a second priority, wherein the second communication is associated with a second subscriber in the connected mode; means for identifying a state of one or more components shared between the first communication and the second communication, wherein the one or more components include at least one of: a transmit/receive switch, a low noise amplifier, or a cross-switch; or means for performing at least one of the first communication or the second communication using a configuration to prevent damage to one or more components of the UE based at least in part on the one or more components being shared between the first communication and the second communication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
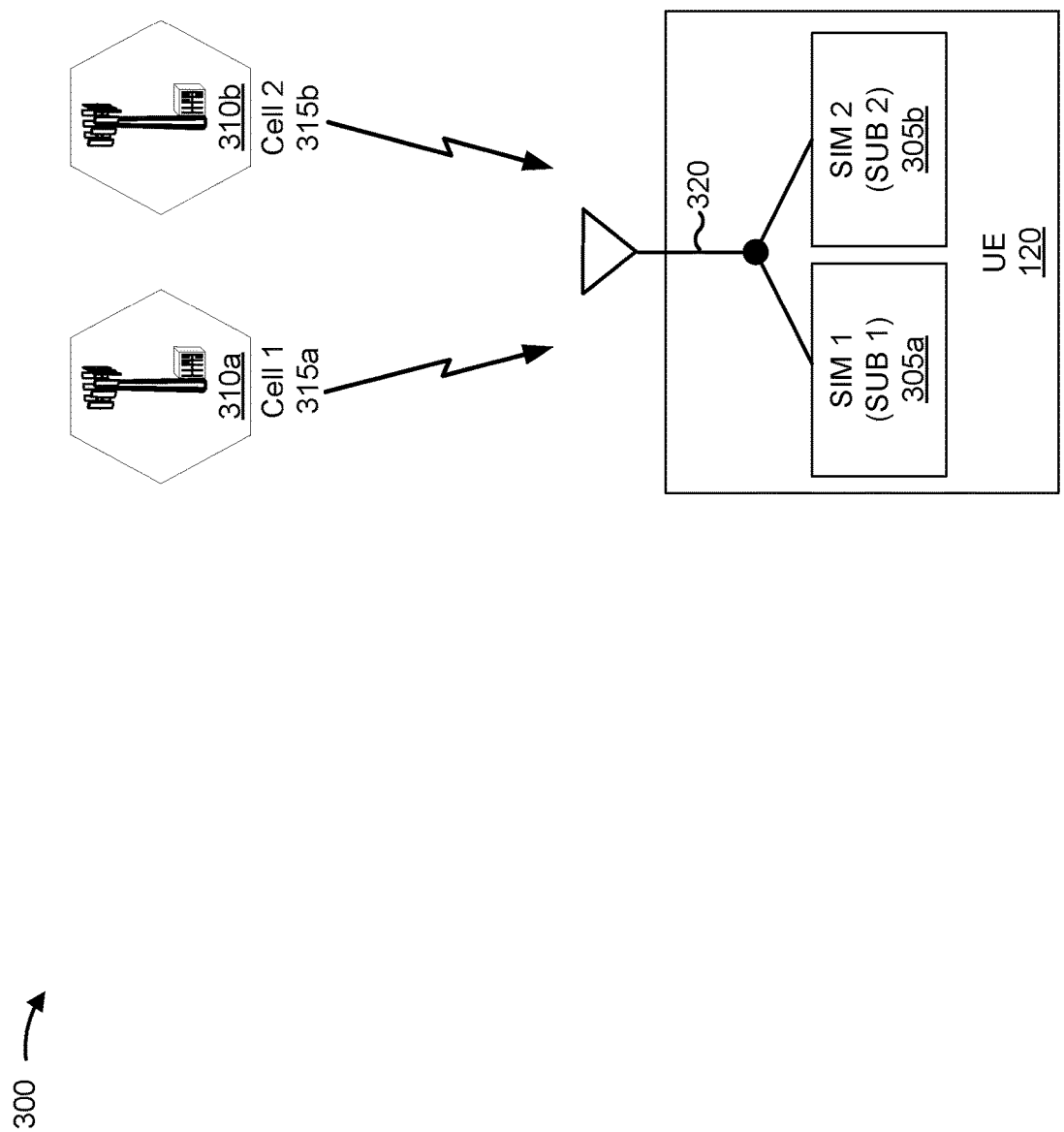
FIG. 3 is a diagram illustrating an example of a multiple subscriber identity module (multi-SIM) UE, in accordance with the present disclosure.

FIG. 3 is a diagram illustrating an example 300 of a multiple subscriber identity module (multi-SIM) UE, in accordance with the present disclosure. As shown in FIG. 3, a UE 120 may be a multi-SIM UE that includes multiple SIMS (two or more SIMs), shown as a first SIM 305a and a second SIM 305b. The first SIM 305a may be associated with a first subscription or subscriber (shown as SUB 1), and the second SIM 305b may be associated with a second subscription or subscriber (shown as SUB 2). A subscription may include a subscription with a network operator (for example, a mobile network operator (MNO)) that enables the UE 120 to access a wireless network (for example, a radio access network (RAN)) associated with the network operator. Generally, "subscriber" is used interchangeably with "SIM" herein.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, a video telephony service, or a gaming service, among other examples. Some of these services may be associated with Quality of Service (QoS) requirements, so associated traffic may be associated with a QoS level. Others of these services may not be associated with QoS requirements, so associated traffic may not be associated with a QoS level, or may be associated with a best-effort QoS level.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). For example, a subscription may be associated with a rate or a limit for data or voice usage, and data or voice usage counted against the subscription may be billed at the rate or counted against the limit. Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, the first cell 315 and the second cell 315b may be provided by the same base station. Thus, the first base station 310a and the second base station 310b may be integrated into a single base station.

In some cases, the UE 120 may be a multi-SIM UE, such as a dual SIM dual active (DSDA) UE, among other examples. A multi-SIM UE may be capable of switching between two separate mobile network services or concurrently using two separate mobile network services, may include hardware for maintaining multiple connections (for example, one connection per SIM) in a standby state, or may include hardware (for example, multiple transceivers) for maintaining multiple network connections at the same time. A DSDA UE may be capable of communicating on two connections at a given time, such as for multiple communications associated with different RATs or multiple communications of a single RAT. The communication on two connections may be handled by an RFFE, which is illustrated in a general sense by reference number 320. The RFFE 320 may include, for example, one or more power amplifiers (PAs), one or more LNAs, one or more band filters, one or more band N-plexers, one or more band switches, one or more antenna switches, or the like.

In a multi-SIM mode such as a DSDA mode, a default data SIM (DDS) subscriber may perform data activity, call activity, or the like. A non-DDS subscriber may perform call-related activity, small data activity (e.g., short message service (SMS) activity or multimedia message service (MMS) activity), or similar tasks.

In some cases, a first service associated with a first subscriber and a second service associated with a second subscriber may be concurrently active (e.g., may have concurrently established communications). In such a situation, the UE may perform concurrent transmissions for two subscribers, concurrent receptions for two subscribers, or transmission for a first subscriber and receptions for a second subscriber. For example, the concurrently active services may communicate on a shared RF hardware front-end module, may share an antenna switch, or may share a TRX switch (described in more detail below).

There are situations in which one or more components of the UE can be damaged by concurrent communication associated with a first subscriber and a second subscriber. For example, in the case of mobile DSDA with RFFE device/component sharing, an RFFE can be damaged or may not operate in a reliable manner due to one subscriber reconfiguring or changing an RFFE device/component setting while the RFFE device/component is in use by another subscriber. Such damage/reliability issues can occur in mobile DSDA because each subscriber can operate or control such shared RFFE devices independently, or each subscriber is not aware of the other subscriber's activities on such shared RFFE devices. Vulnerable RFFE devices/components include TRX switches, LNAs, and cross-switches. If such an RFFE device/component is damaged, performance of the UE may be degraded and repair costs may be incurred. Furthermore, the usage of DSDA communication may be hampered or barred to prevent damage to RFFE devices/components, which reduces the throughput of the UE and diminishes the efficiency of network resource usage.

Figure 4:
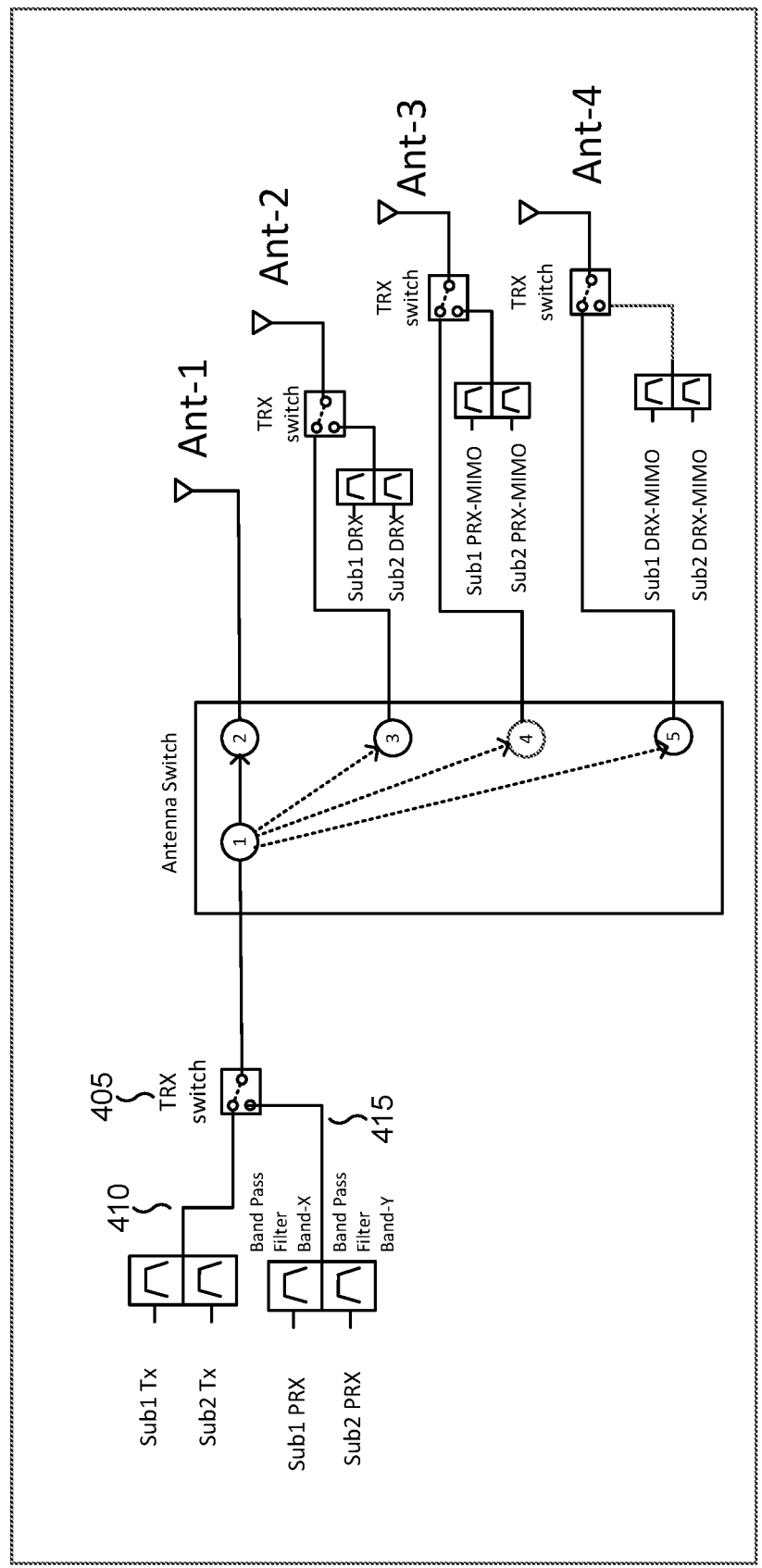
FIG. 4 is a diagram illustrating an example of a radio frequency front end (RFFE) comprising several transmit/receive (TRX) switches, in accordance with the present disclosure.
Figure 5:
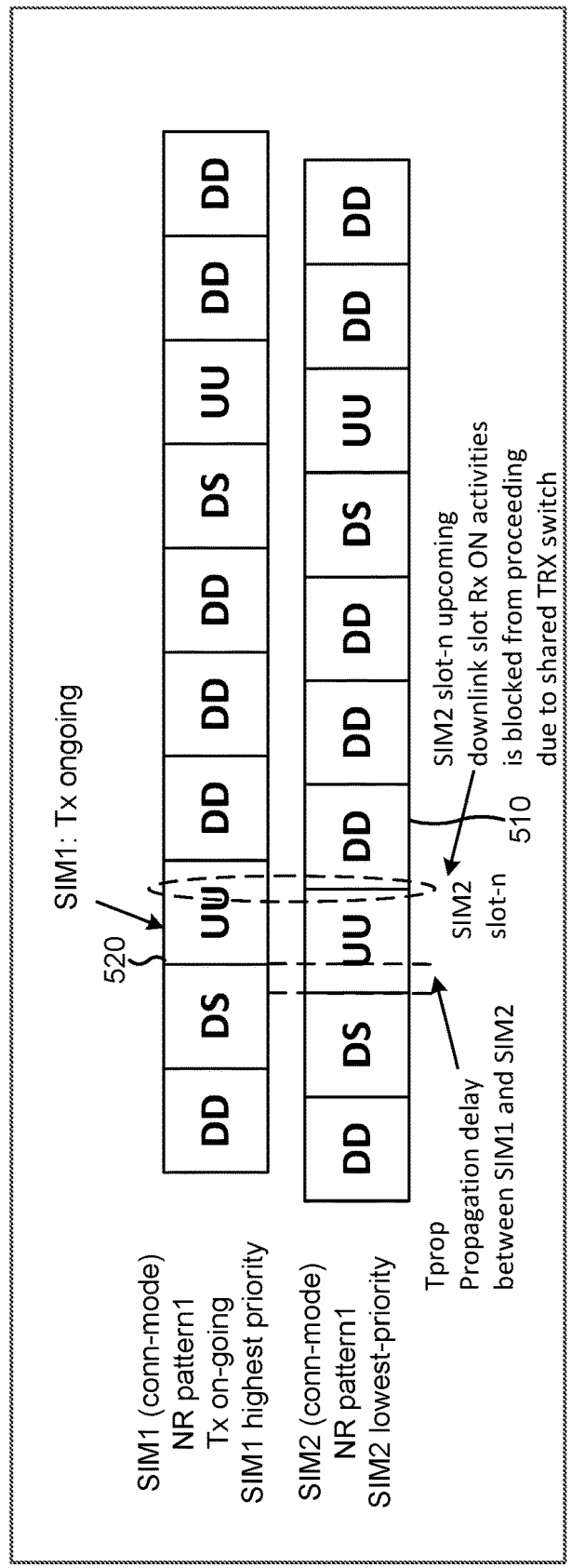
FIG. 5 is a diagram illustrating an example of slot timing for a first subscriber and a second subscriber, in accordance with the present disclosure.
Figure 6:
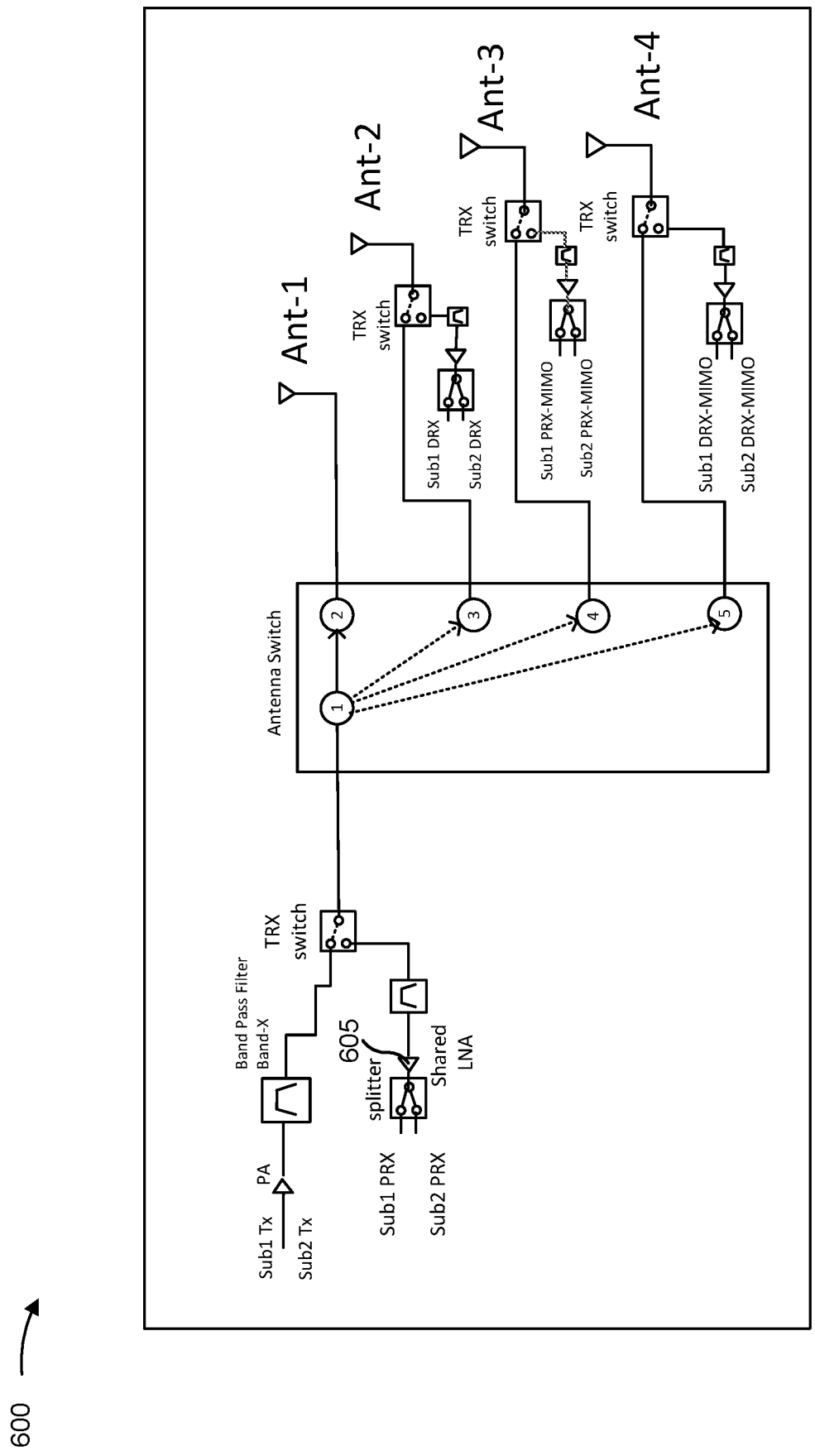
FIG. 6 is a diagram illustrating an example of an RFFE comprising a shared low noise amplifier (LNA), in accordance with the present disclosure.
Figure 11:
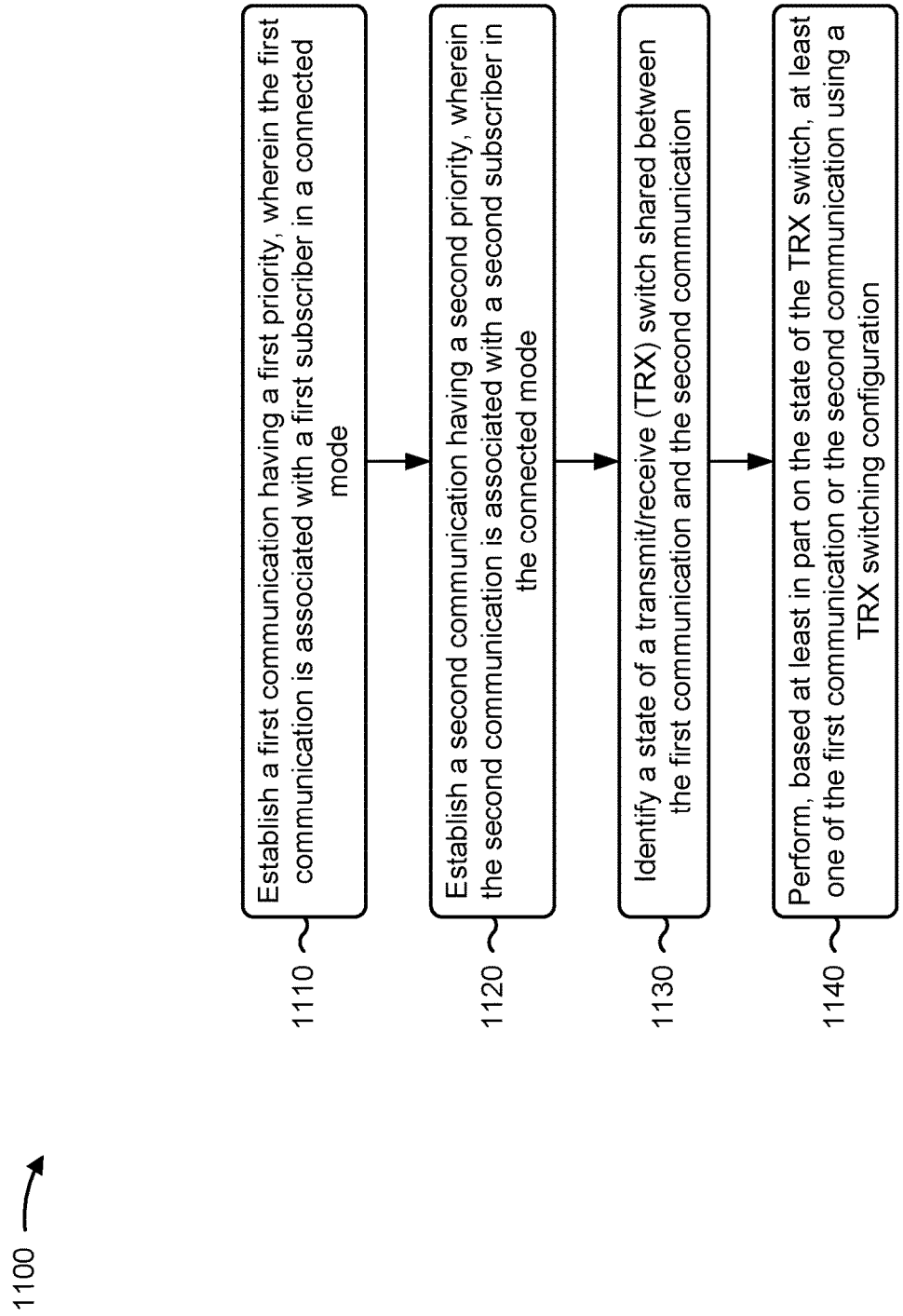
FIGS. 11-14 are diagrams illustrating example processes associated with RFFE component protection, in accordance with the present disclosure.
Figure 12:
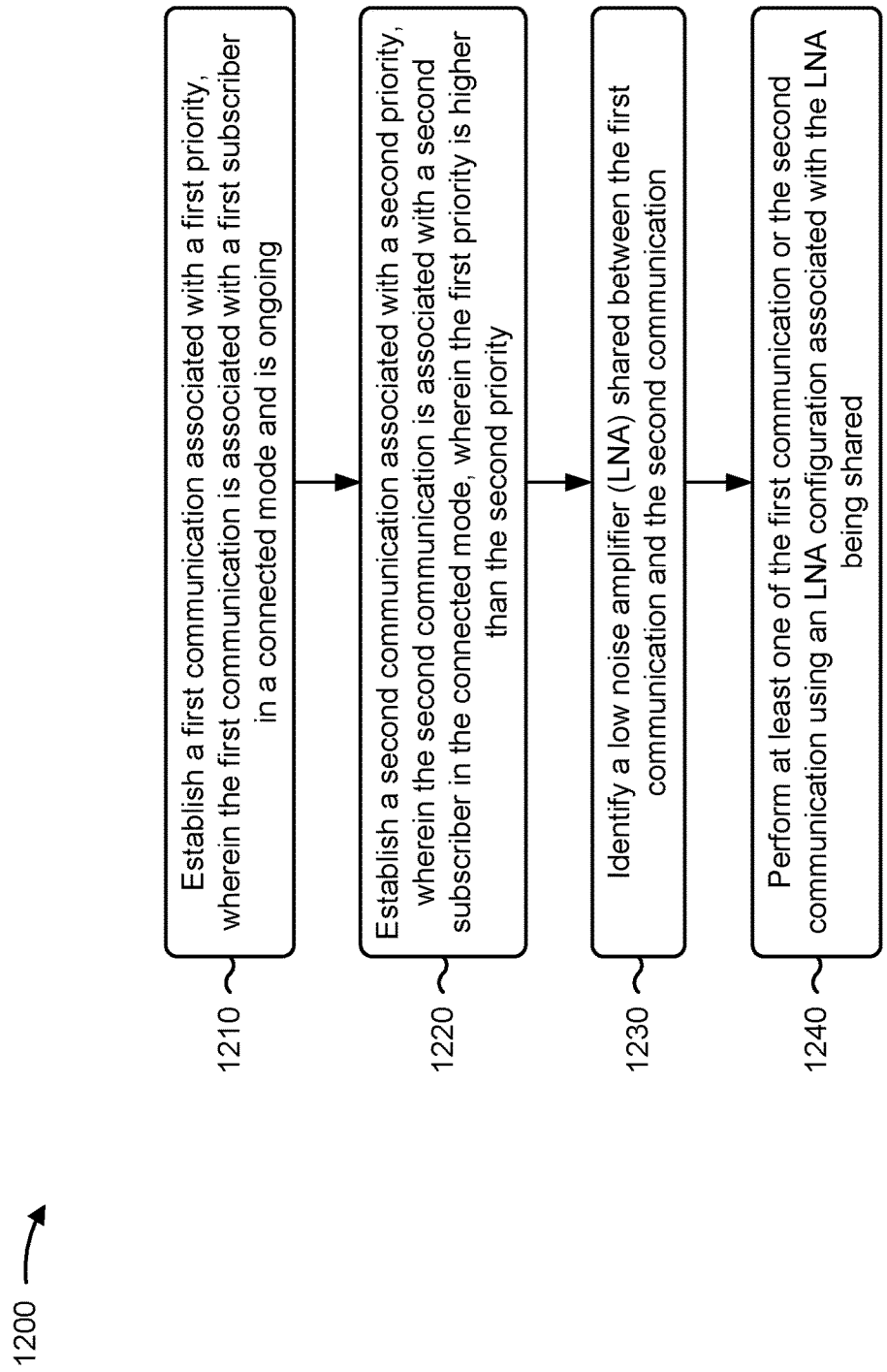

Techniques and apparatuses described herein provide control of DSDA communications of a UE using a configuration to prevent damage to RFFE devices/components in the case of concurrent communications associated with multiple subscribers. Some techniques and apparatuses described herein, described in connection with FIGS. 4, 5, and 11, provide management of a shared TRX switch of a first subscriber and a second subscriber based at least in part on respective priorities of the first subscriber and the second subscriber. Different subscribers and/or communications may be associated with different priorities. For example, such priorities may be based at least in part on a schedule associated with the different subscribers, quality of service properties associated with communications, a designation of a subscriber as a primary subscriber or DDS, or the like. Some techniques and apparatuses described herein, described in connection with FIGS. 6 and 12, provide management of an RFFE with a shared LNA based at least in part on respective priorities of the first subscriber and the second subscriber. Some techniques and apparatuses described herein, described in connection with FIGS. 7-10 and 13, provide management of an RFFE with a shared cross-switch based at least in part on respective priorities of the first subscriber and the second subscriber.

In this way, damage to RFFE devices/components of the UE is prevented, which enables the usage of DSDA communication, improves throughput, and reduces wear on the UE.

As indicated above, FIG. 3 is provided as an example. Other examples may differ from what is described with regard to FIG. 3.

FIG. 4 is a diagram illustrating an example of an RFFE 400 comprising a shared TRX switch 405, in accordance with the present disclosure. RFFE 400 may be included in a UE such as UE 120. RFFE 400 may support communications by a first subscriber (illustrated as "Sub1") and a second subscriber (illustrated as "Sub2"). As shown, RFFE 400 includes a plurality of antennas (Ant-1, Ant-2, Ant-3, and Ant-4), an antenna switch, and the shared TRX switch 405. A TRX switch 405 is a switch used for a time division duplexing (TDD) band to enable a transmit front-end path to an antenna and a receive front-end path to the antenna, whereby the transmit and receive paths are switched to the same antenna (for TDD, this is possible due to different slots being used for transmission and reception).

As further shown, the TRX switch 405 is shared between Sub1 and Sub2, such as between a main transmit path 410 and a primary receive (PRX) chain 415, meaning that either of Sub1 or Sub2 can trigger the TRX switch 405 (via a switch request). For example, the TRX switch 405 may be switchable between Sub1 and Sub2, meaning that either of Sub1 or Sub2 can trigger the TRX switch 405 (via a switch request). As further shown, there may be other TRX switches of RFFE 400, such as associated with a diversity receive (DRX) chain, a PRX MIMO chain, and/or a DRX MIMO chain. The techniques and apparatuses described herein can also be applied for these TRX switches, such as if these TRX switches are shared between the first subscriber and the second subscriber.

Operations described in FIG. 4 as being performed by a UE may be performed by a component of the UE, such as a modem controller of the UE, a processor of the UE, a controller/processor of the UE, or the like. In some aspects, the modem controller may have information indicating current and upcoming transmission and reception activity across subscribers.

In some aspects, the UE may establish a first communication associated with a first subscriber (e.g., Sub1) and a second communication associated with a second subscriber (e.g., Sub2). For example, the UE may enter a DSDA mode, and may establish radio resource control (RRC) connections for the first communication and the second communication. The UE may identify that the TRX switch 405 is shared between the first subscriber and the second subscriber. For example, the UE may determine if the UE, in DSDA mode, has a shared TRX switch between Sub1 and Sub2. In some aspects, such a determination may be made when Sub1 and Sub2 are configured in DSDA mode with transmit and receive RF devices. For example, from a UE protocol state perspective, both subscribers may be operating in an RRC connected-mode state. The TRX switch 405 may be an analog component, and due to RFFE component sharing for subscribers, there are configurations whereby the TRX switch 405 can be shared. Such TRX switch sharing can have an impact on RFFE device reliability. For example, a PA may have to meet ruggedness specifications while ensuring that a PA on Sub1 is not turned off mid-transmission by Sub2. Techniques described herein provide handling from the DSDA concurrency protocol point-of-view in order to ensure RFFE device reliability can be guaranteed when such devices are shared.

The UE may identify a state of the TRX switch 405. The UE may perform, based at least in part on the state of the TRX switch 405, at least one of the first communication or the second communication using a TRX switching configuration (sometimes referred to herein as a configuration to prevent damage to one or more components). A TRX switching configuration may indicate how and/or whether the TRX switch can be switched based at least in part on the first communication and the second communication, such as based at least in part on respective priorities of the first communication and the second communication. As one example, the TRX switching configuration may indicate when a subscriber is permitted to trigger the TRX switch 405, or that the TRX switch 405 is to be prevented from switching to a state associated with a particular communication, of the first communication or the second communication. A TRX switch 405 may be in a state associated with a particular communication if the TRX switch 405 is in a state configured by a subscriber associated with the particular communication.

As another example, the TRX switching configuration may ensure that a higher-priority communication can trigger a TRX switch and that a lower-priority communication is blanked during the higher-priority communication's switching of the TRX switch and subsequent communication. In some aspects, the TRX switching configuration is based at least in part on whether a transmission or reception is ongoing for a given subscriber. Particular examples of actions performed in accordance with a TRX switching configuration are provided below.

For a subscriber with a transmission ongoing, when the subscriber is associated with a higher priority of each concurrently active subscriber associated with the UE, the UE may ensure that the higher priority subscriber is not interrupted by a non-priority (e.g., lower priority than the higher priority subscriber) subscriber's reception by ensuring that the TRX switch 405 is not changed (that is, by preventing the TRX switch from switching to a state associated with the non-priority subscriber's reception). For example, a modem controller that is aware of current and upcoming transmission and reception activity across subscribers may ensure a highest priority subscriber's transmission is not interrupted by a non-priority subscriber's reception by ensuring that a TRX transmission configuration (e.g., a setting of the TRX switch 405) is not changed.

For a subscriber with a reception ongoing, when the subscriber is associated with a higher (e.g., highest) priority of each concurrently active subscriber associated with the UE, the UE may ensure that the higher priority subscriber is not interrupted by a non-priority subscriber's transmission by ensuring that the TRX switch 405 is not changed. For example, for a subscriber with reception ongoing, with highest priority, a modem controller that is aware of current and upcoming transmission and reception activity across subscribers may ensure that the highest priority sub's reception is not interrupted by a non-priority subscriber's transmission by ensuring that a TRX reception configuration (e.g., a setting of the TRX switch 405) is not changed. For example, the modem controller may prevent the TRX switch 405 from switching to a state associated with the non-priority subscriber's transmission. As used herein, "preventing a TRX switch from switching" can include "not switching the TRX switch," "disregarding a switch request associated with the TRX switch," or "disregarding a reconfiguration by a subscriber of the TRX switch," etc.

For a subscriber with a transmission ongoing, when the subscriber is associated with a lower priority of each concurrently active subscriber associated with the UE, the UE may ensure that a higher priority subscriber's reception can proceed. For example, the UE may blank the ongoing subscriber's transmission (such as at a PA or digital-audio converter (DAC) output), and the TRX switch 405 may be switched to a receive configuration (that is, to a state associated with the higher priority subscriber's reception), thereby allowing the reception activity of the higher priority subscriber.

For a subscriber with a reception ongoing, when the subscriber is associated with a lower priority of each concurrently active subscriber associated with the UE, the UE may ensure that a higher priority subscriber's transmission can proceed. For example, the UE may blank the ongoing subscriber's reception, and may set the TRX switch 405 to a transmit configuration (that is, to a state associated with the higher priority subscriber's transmission), thereby allowing transmit activity of the higher priority subscriber to proceed.

If both subscribers are associated with no current transmission/reception activity, the UE may ensure that a highest priority subscriber's transmission or reception can make use of an upcoming slot. For example, any upcoming lower-priority subscriber's transmission or reception, that overlaps with such a slot, may be blanked or postponed, and cannot be scheduled for use on such a slot. An example is provided in FIG. 5.

FIG. 5 is a diagram illustrating an example 500 of slot timing for a first subscriber and a second subscriber, in accordance with the present disclosure. In FIG. 5, a first SIM (SIM1) is associated with a first slot pattern and a second SIM (SIM2) is associated with a second slot pattern. As further shown, some propagation delay (Tprop) may be present between the first SIM and the second SIM, such as due to the first SIM and the second SIM being associated with different base stations. In this case, the UE may blank a communication of the second SIM (e.g., may block the second SIM from reception) in slot 510 due to an ongoing transmission, associated with a higher priority, from SIM1 in slot 520.

Further examples of the TRX switching configuration are provided below, with reference to a first subscriber (sub1) and a second subscriber (sub2). In these examples, a lower priority subscriber is referred to as "lowest-priority," and a higher priority subscriber is referred to as "highest-priority." In the examples below, the UE may determine if the UE is in DSDA mode with full concurrency DSDA (e.g., sub1 has one or more transmit and receive (Tx/Rx) front-end paths and sub2 has one or more Tx/Rx front-end paths) or Tx-sharing DSDA (e.g., sub1 and sub2 share a transmit PA and each has one receive front-end path).

If the first subscriber's transmitter chain (hereinafter referred to as "sub1 Tx," and which may represent the RFFE path from an output of a transceiver of the UE to an antenna for sub1's transmission function) and the second subscriber's receiver chain (hereinafter referred to as "sub2 Rx," and which may represent the RFFE path from a receive antenna to an input of a transceiver for sub2's receiving function) share a TRX switch, and if sub1 Tx is on-going and sub1 is highest-priority, the UE may prevent any sub2 Rx activity and ensure the TRX switch's transmit configuration is not changed (e.g., may prevent the TRX switch from switching to a state associated with sub2's reception activity). If sub1 Tx and sub2 Rx share a TRX switch, and if sub1 Tx is on-going and sub1 is lowest-priority, the UE may blank sub1 Tx PA or DAC output (e.g., may trigger the PA or DAC to blank sub1's transmission) and may allow sub2 Rx activity by reconfiguring the TRX switch to a receive configuration. If sub1 Tx and sub2 Rx share a TRX switch, and if sub1 Tx is off and sub2 Rx is off, the UE may allow the next use of shared TRX switch based at least in part on which subscriber has higher priority if there is sub1 Tx and sub2 Rx time-domain activity overlap for an upcoming slot. If sub1 Tx and sub2 Rx share a TRX switch, and if sub2 Rx is ongoing and sub2 is highest-priority, the UE may prevent any sub1 Tx activity and may ensure the TRX Rx configuration is not changed (e.g., may prevent the TRX switch from switching to a state associated with sub1's transmission activity). If sub1 Tx and sub2 Rx share a TRX switch, and if sub2 Rx is on-going and sub2 is lowest-priority, the UE may blank sub1 Rx and allow sub1 Tx activity and allow sub1 Tx activity by reconfiguring the TRX switch to a transmit configuration. A transmit configuration is a configuration (e.g., state) of the TRX switch that provides a transmit RFFE path to an antenna. A receive configuration is a configuration (e.g., state) of the TRX switch that provides a receive RFFE path to an antenna.

If sub1 Rx and sub2 Tx share a TRX switch, and if sub1 Rx (e.g., the first subscriber's receive function) is on-going and sub1 is highest-priority, the UE may prevent any sub2 Tx activity (e.g., activity of the second subscriber's transmit function) and ensure TRX Rx configuration is not changed (e.g., may prevent the TRX switch from switching to a state associated with sub2's transmission activity). If sub1 Rx and sub2 Tx share a TRX switch, and if sub1 Rx is on-going and sub1 is lowest-priority, the UE may blank sub1 Rx and allow sub2 Tx activity and allow sub2 Tx activity by reconfiguring the TRX switch to a transmit configuration. If sub1 Rx and sub2 TX share a TRX switch, and if sub1 Rx is off and sub2 Tx is off, the UE may allow a next use of a shared TRX switch based at least in part on which sub has higher priority if there is sub1 Rx and sub2 Tx time-domain activity overlap for an upcoming slot. If sub1 Rx and sub2 TX share a TRX switch, and if sub2 Tx is on-going and sub2 is highest-priority, the UE may prevent any sub1 reception activity and ensure that the TRX switch's transmit configuration is not changed (e.g., may prevent the TRX switch from switching to a state associated with sub1's reception activity). If sub1 Rx and sub2 TX share a TRX switch, and if sub2 Tx is on-going and sub2 is lowest-priority, the UE may blank sub2 Tx PA or DAC output (e.g., may trigger the PA or DAC to blank sub2's transmission) and allow sub1 Rx activity and allow sub1 Rx activity by reconfiguring the TRX switch to a receive configuration.

As indicated above, FIGS. 4 and 5 are provided as examples. Other examples may differ from what is described with regard to FIGS. 4 and 5.

FIG. 6 is a diagram illustrating an example of an RFFE 600 associated with a shared LNA, in accordance with the present disclosure. RFFE 600 may be included in a UE such as UE 120. RFFE 600 may support communications by a first subscriber (illustrated as "Sub1") and a second subscriber (illustrated as "Sub2"). As shown, RFFE 400 includes a plurality of antennas (Ant-1, Ant-2, Ant-3, and Ant-4), an antenna switch, and an LNA 605. An LNA 605 is an amplifier used for received communications. In some aspects, an LNA 605 can be damaged if the LNA 605 is improperly managed, such as if the LNA 605 is exposed to an uplink transmission of the UE.

As further shown, the LNA 605 is shared between Sub1 and Sub2, such as between PRX paths of Sub1 and Sub2. For example, the LNA 605 may be switchable between Sub1 and Sub2, meaning that the LNA 605 can be configured for amplification of reception by Sub1 or amplification of reception by Sub2. As further shown, there may be other LNAs of RFFE 600, such as associated with a DRX chain, a PRX MIMO chain, and/or a DRX MIMO chain. The techniques and apparatuses described herein can also be applied for these LNAs, such as if these LNAs are shared between the first subscriber and the second subscriber.

Operations described in FIG. 6 as being performed by a UE may be performed by a component of the UE, such as a modem controller of the UE, a processor of the UE, a controller/processor of the UE, or the like. In some aspects, the modem controller may have information indicating current and upcoming transmission and reception activity across subscribers.

In some aspects, the UE may determine if the UE, in DSDA mode, has a shared LNA between Sub1 and Sub2. For example, the UE may determine a state of the LNA, where the state indicates whether the LNA is shared between Sub1 and Sub2. For example, the UE may perform this determination when Sub1 and Sub2 are configured in DSDA mode with Tx and Rx RF devices. From a UE protocol state perspective, both subs may be operating in an RRC connected-mode state, as described in connection with FIG. 4. The LNA 605 is an analog component, and due to front-end component sharing for subscribers, there are configurations whereby the LNA 605 can be shared for co-banded or spectrum overlapped use-cases in mobile DSDA. LNA device reliability is of concern in such configurations, and the techniques described below enable protection of the shared LNA 605 in DSDA mode. In some aspects, the techniques described herein may be applied for TDD co-banded or spectrum overlap (e.g., bands N78+N77 have spectrum overlap). Thus, techniques and apparatuses described herein provide determination of whether DSDA Sub1 and Sub2 are TDD co-banded or spectrum overlapped with a shared LNA 605, such as at the time of configuring Sub1 and Sub2 into mobile DSDA mode.

The UE may perform at least one of a first communication (associated with a first priority) or a second communication (associated with a second priority) using an LNA configuration (sometimes referred to herein as a configuration to prevent damage to one or more components) associated with the LNA 605 being shared. For example, the UE may establish the first connection, associated with the first subscriber and the first priority, and the second connection, associated with the second subscriber and the second priority. The LNA configuration indication may indicate a configuration for performing one or more of the first communication or the second communication based at least in part on the respective priorities of the first communication and the second communication such that the LNA 605 is not damaged or degraded.

For a subscriber with a transmission ongoing with a highest priority (e.g., the first subscriber), the UE may determine if the second subscriber's reception is overlapping with the transmission in time domain. If the second subscriber's reception overlaps, the UE may blank the second subscriber's reception, or may receive the reception based at least in part on a protected mode (e.g., in which an input to the LNA 605 is terminated into a load (e.g., a 50 ohm load), a high-impedance mode, or is terminated to ground) based at least in part on such time-domain overlap across DSDA subs being detected. In this way, the LNA 605 may not be damaged by the transmission in the time domain. This may be applicable for TDD bands whereby transmission and reception per subscriber are non-overlapping. For multi-SIM DSDA, the transmission on the first subscriber can overlap with the reception on second subscriber due to over-the-air propagation delays, such as if sub1 is served by a different base station than sub2 and the different base stations are not co-located.

For a subscriber with an ongoing transmission with a lower priority, the UE may determine whether the ongoing transmission overlaps a reception of another subscriber with a higher priority. The UE may ensure that the lower priority subscriber's transmission is blanked (such as via active Tx PA output blanking or by zeroing DAC output). Thus, the UE may ensure that priority subscriber's reception operations are not interrupted, while causing minimal performance impact.

As indicated above, FIG. 6 is provided as an example. Other examples may differ from what is described with regard to FIG. 6.

FIGS. 7-10 are diagrams illustrating examples of RFFEs 700, 800, 900, 1000 comprising a shared cross-switch, in accordance with the present disclosure. RFFE 700/800/900/1000 may be included in a UE such as UE 120. RFFE 700/800/900/1000 may support communications by a first subscriber (illustrated as "Sub1") and a second subscriber (illustrated as "sub2"). As shown, RFFE 700/800/900/1000 includes a plurality of antennas (Ant-1, Ant-2, Ant-3, and Ant-4) and a cross-switch 705/805/905/1005. A cross-switch is a switch that enables any of multiple paths (shown to the left of the cross-switch) to be connected to any of the plurality of antennas. The cross-switch may include a set of cross-switch ports (illustrated by reference number 710 in FIG. 7). Each antenna may be associated with an antenna port. The cross-switch is an analog component, and due to RFFE component sharing for subscribers, the cross-switch may be shared across subscribers when sub1 and sub2 are operating in same RF band group (e.g., sub1 mid-band+sub2 mid-band, sub1 ultra-high band (UHB)+sub2 UHB, sub1 low band (LB)+sub2 LB, etc.). For example, the cross-switch may be switchable between the first subscriber and the second subscriber, meaning that either of the first subscriber or the second subscriber can initiate a switch request for the cross-switch. Cross-switch device reliability involves avoiding hot-switching on the cross-switch (that is, changing the cross-switch configuration while there is active transmission or reception on-going). The techniques described herein provide DSDA RFFE device protection when the shared cross-switch configuration is changed, such that corresponding Tx/Rx devices such as PA and LNAs are protected. For example, techniques described herein provide coordination to ensure hot-switching of cross-switches is avoided, which improves cross-switch device reliability and prevent damage to Tx/Rx devices connected to the cross-switch in mobile DSDA operating mode.

In some aspects, the UE may receive or generate a switch request for a cross-switch from one of a first subscriber or a second subscriber. The UE may process the switch request based at least in part on which subscriber, of the first subscriber or the second subscriber, triggered the switch request. For example, the UE may process the switch request based at least in part on respective priorities of the first subscriber and the second subscriber and/or a state of the cross-switch, as described below. The UE may process the switch request according to a configuration to prevent damage to one or more components of the UE (e.g., the cross-switch). The configuration to prevent damage may indicate a set of criteria based on which the UE may process the switch request. As described below, processing a switch request can include switching the cross-switch (e.g., performing an antenna switch reconfiguration), blanking a communication, postponing a switch of the cross-switch, canceling a switch of the cross-switch, or a combination thereof. An antenna switch reconfiguration is a modification of the configuration of a cross-switch. For example, an antenna switch reconfiguration may involve a switch from a configuration of a cross-switch that connects a first path to a first antenna, to a configuration of the cross-switch that connects the first path to a second antenna. A switch request may indicate a desired configuration of a cross-switch, or may request control of the cross-switch such that a subscriber that triggers the switch request can configure the desired configuration of the cross-switch. The state of the cross-switch may be the configuration of the cross-switch and/or whether the cross-switch is under control by the first subscriber or the second subscriber.

For a subscriber with a higher priority that triggers a switch request, the UE may ensure that the higher priority antenna switch reconfiguration triggered by the subscriber with the higher priority can be supported. For example, the UE may determine if there is any non-priority subscriber's transmission or reception impacted by such priority subscriber antenna-switch reconfiguration. If a non-priority subscriber's transmission or reception is impacted, the non-priority subscriber's transmission or reception may be blanked during an antenna switch reconfiguration initiated by the priority subscriber. For example, a modem controller that is aware of current and upcoming antenna switching may ensure that an antenna switch reconfiguration of a highest priority subscriber can be supported by determining if there is any non-priority subscriber transmission or reception impacted by such highest priority subscriber's antenna switch reconfiguration. In this example, the non-priority subscriber's transmission or reception may be blanked during the antenna switch reconfiguration initiated by priority sub. In some aspects, the antenna switch may be associated with an antenna switched diversity (Asdiv) configuration. For example, the priority subscriber may reconfigure a shared antenna switch for Asdiv purposes to switch a transmission to a best antenna based at least in part on antenna performance metrics such as reference signal received power or transmit power headroom comparison across valid antennas. In some aspects, the antenna switch may be associated with a sounding reference signal (SRS) antenna switching configuration. For example, the priority subscriber may reconfigure a shared antenna switch for SRS antenna switching purposes to switch transmission of an SRS from a default transmit antenna (such as used for shared channel or control channel transmission) to send SRS sounding information (such as an SRS) on another valid antenna used for reception.

For a subscriber with a lower priority that triggers a switch request, the UE may ensure that a higher priority antenna switch configuration is not impacted. For example, the UE may postpone (e.g., pend) the lower priority subscriber's switch request until the higher priority subscriber's Tx/Rx activity has completed, then may allow the lower priority sub to switch the configuration of the cross-switch. As another example, the UE may cancel the lower priority subscriber's switch request if the switch request would result in the priority subscriber not acquiring a preferred transmit antenna or would result in the priority subscriber's transmission or reception being blanked due to the lower priority subscriber's antenna switch reconfiguration. As yet another example, the UE may allow (e.g., perform an antenna switch reconfiguration in accordance with) the lower priority subscriber's switch request if an antenna switch reconfiguration indicated by the antenna switch for the lower priority subscriber does not impact the priority subscriber's existing Tx/Rx operations (provided that antenna switch hardware control allows independent control of such hardware configurations). This case may be for shared cross-switch hardware where multiple antenna ports are supported on such hardware, whereby antennas used for antenna switching are orthogonal with regard to antennas and switch port resources used by the priority subscriber and the non-priority subscriber.

Figure 7:
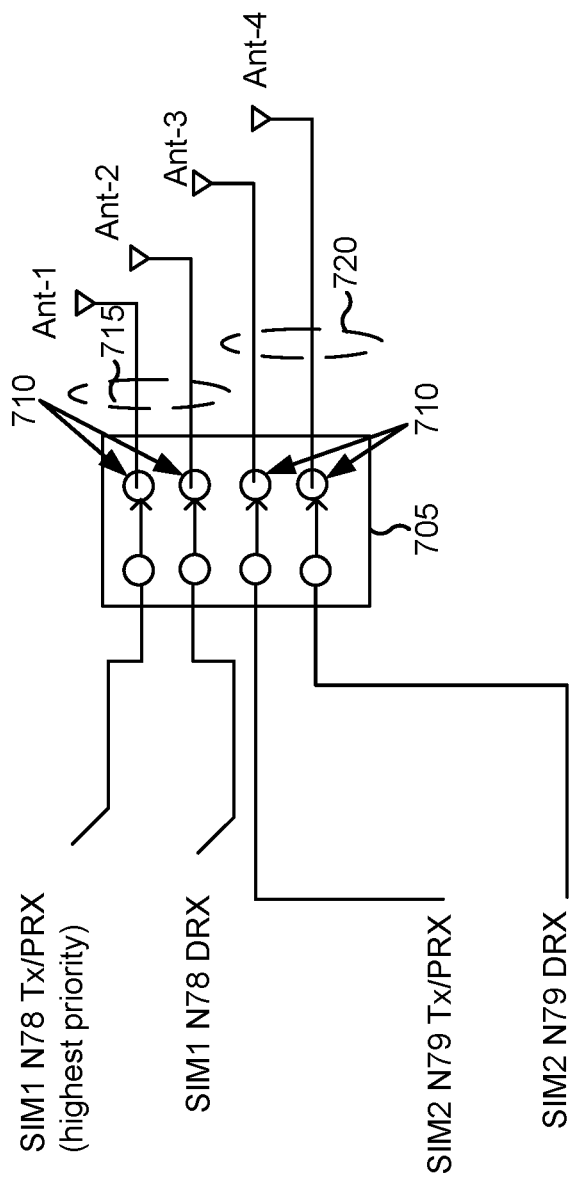
FIGS. 7-10 are diagrams illustrating examples of RFFEs comprising a shared cross-switch, in accordance with the present disclosure.

FIG. 7 shows a configuration with orthogonal antenna resource and port allocation. In RFFE 700 of FIG. 7, the cross-switch 705 is shared between the first subscriber (SIM1) and the second subscriber (SIM2). The first subscriber is associated with a higher priority than the second subscriber. As shown by the oval indicated by reference number 715, the UE may permit the first subscriber to use or reconfigure antennas and antenna ports for antennas 1 and 2, meaning that the first subscriber can switch a transmit path or receive path between an antenna port associated with Ant-1 and an antenna port associated with Ant-2. As shown by the oval indicated by reference number 720, the UE may permit the second subscriber to use or reconfigure antennas and antenna ports for antennas 3 and 4, meaning that the second subscriber can switch a transmit path or receive path between an antenna port associated with Ant-3 and an antenna port associated with Ant-4. For example, the UE may perform antenna switch reconfiguration for antennas 1 and 2 if requested by the first subscriber, and may perform antenna switch reconfiguration for antennas 3 and 4 if requested by the second subscriber. The antenna resource and port allocation is considered orthogonal because the first subscriber is permitted to use or reconfigure a first set of antennas and antenna ports, and the second subscriber is permitted to use or reconfigure a second set of antennas and antenna ports, where no antenna or antenna port is shared between the first set and the second set.

Figure 8:
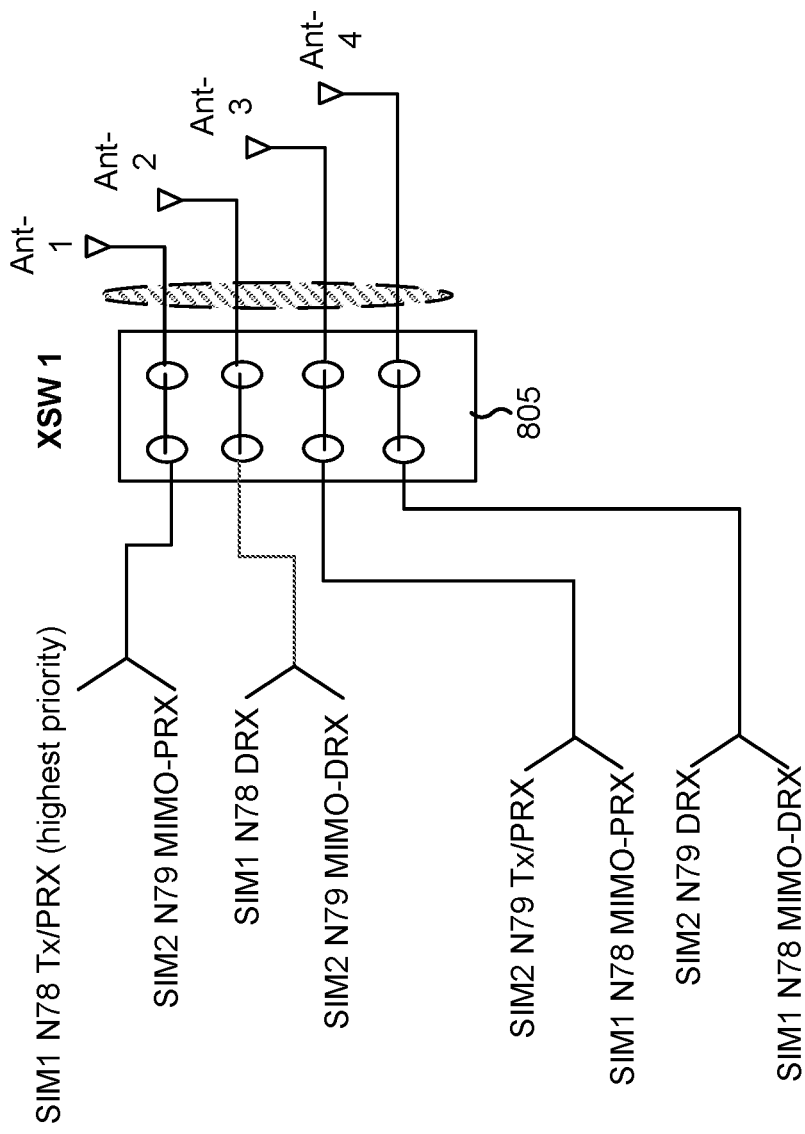

FIG. 8 shows a configuration with a shared cross-switch 805, with overlapping antenna resources and port allocation. In RFFE 800 of FIG. 8, the first subscriber (SIM1), which is associated with a higher priority, is permitted to use or reconfigure antennas and antenna ports for all four antennas of RFFE 800. For example, the first subscriber can use or reconfigure antennas and antenna ports for each antennas 1, 2, 3, and 4. The second subscriber (SIM2), which is associated with a lower priority, may be deprioritized relative to the first subscriber. For example, SIM2 may be reconfigured whenever SIM1 needs use of SIM2's antennas or antenna ports, which, may involve transmission or reception blanking when needed. Therefore, SIM2's switch requests may be overridden if SIM1 requests an antenna or antenna port being used for communication by SIM2 or if SIM2 requests an antenna or antenna port being used for communication by SIM1, and SIM2 may be blanked if needed.

Figure 9:
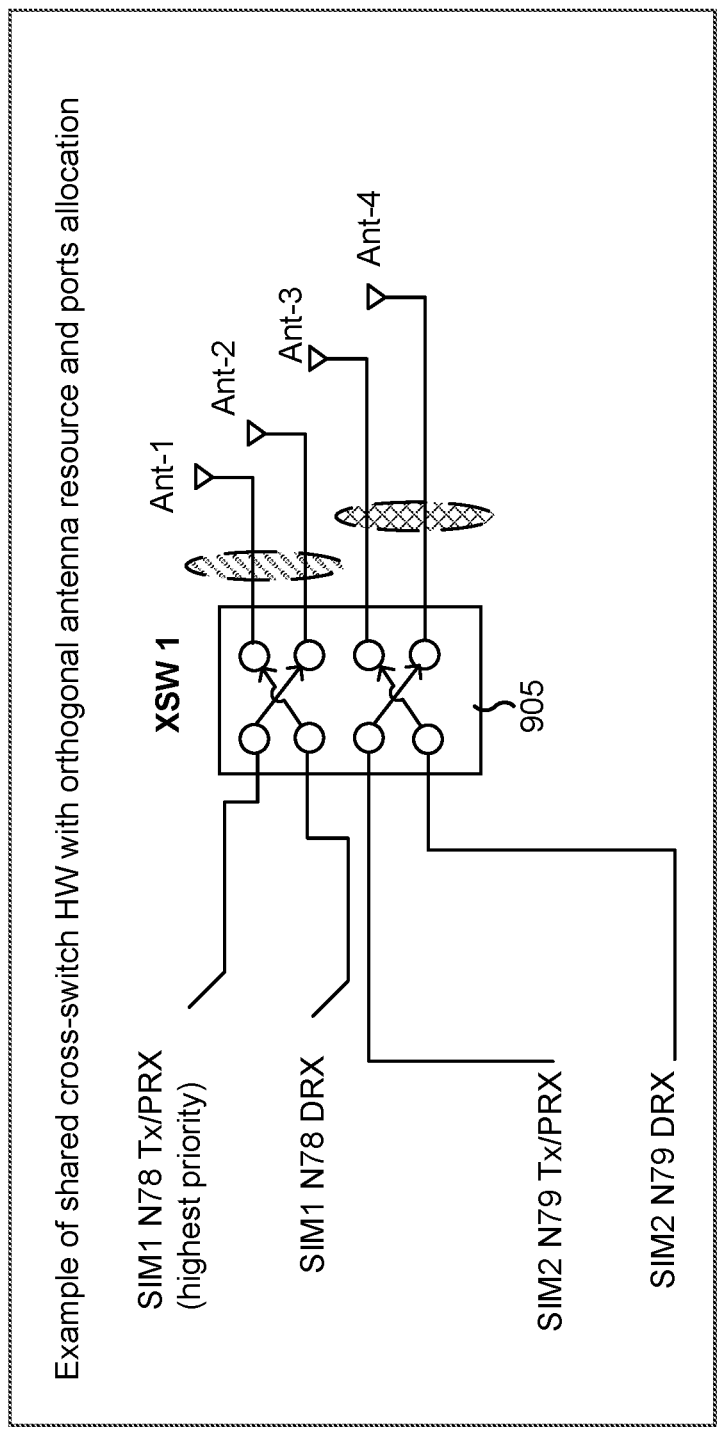

FIG. 9 shows a configuration with a shared cross-switch 905, with orthogonal antenna resources and port allocation. In RFFE 900 of FIG. 9, the first subscriber (SIM1), which is associated with a higher priority, is permitted to use or reconfigure the cross-switch 905 such that the transmission or PRX on band N78 is switched between antenna 1 and antenna 2. For example, SIM1 may be allowed to reconfigure band N78's transmission or PRX from antenna 1 to antenna 2 with no interruption to SIM2 due to the orthogonal antenna ports used for the shared cross-switch. The second subscriber (SIM2), which is associated with a lower priority, may be permitted to use or reconfigure the cross-switch 905 such that the transmission or PRX on band N79 is switched between antennas 3 and 4. Thus, the first subscriber can switch transmission or primary reception between antennas 1 and 2 without interrupting communications of the second subscriber, and the second subscriber can switch transmission or primary reception between antennas 3 and 4 without interrupting communications of the first subscriber, due to the allocation of orthogonal antenna ports used for the shared cross-switch.

Figure 10:
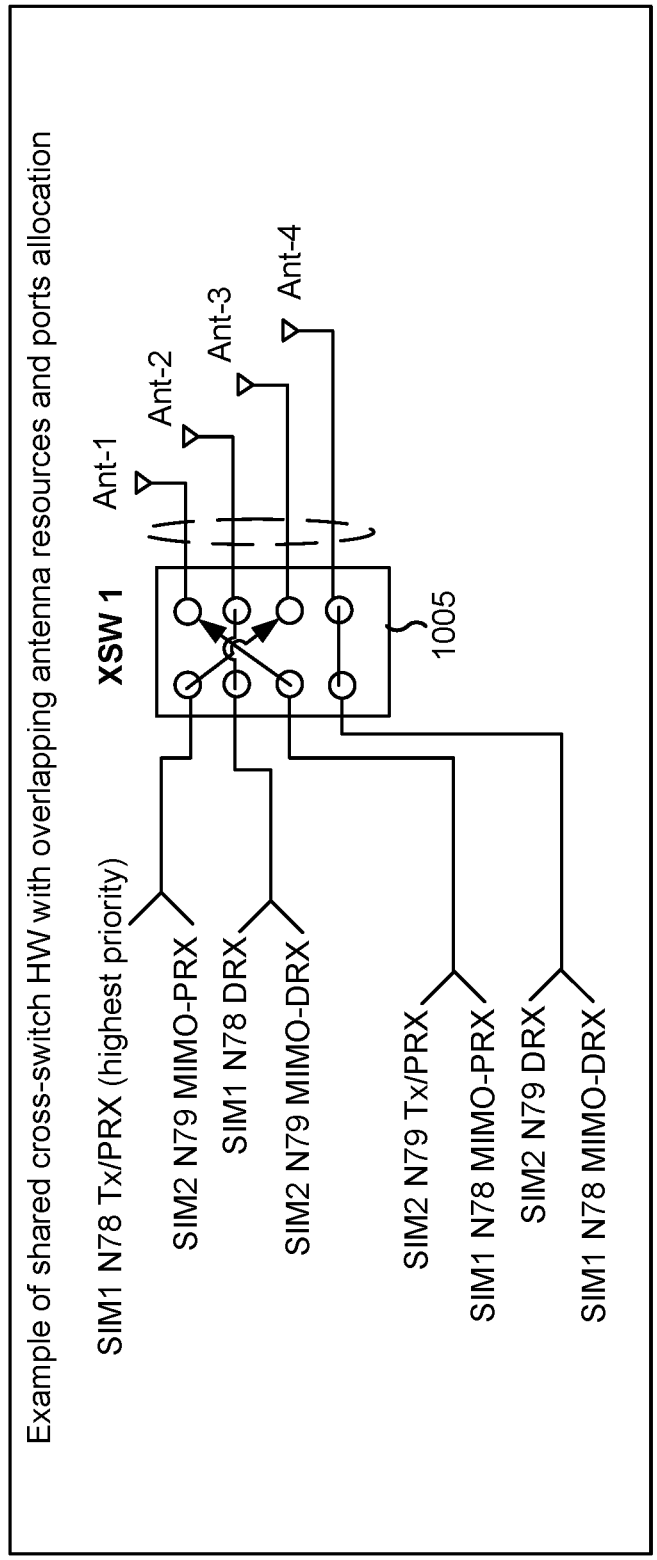

FIG. 10 shows a configuration with a shared cross-switch 1005, with overlapping antenna resources and port allocation. In RFFE 1000 of FIG. 10, the first subscriber (SIM1), which is associated with a higher priority, is permitted to use or reconfigure the cross-switch 1005 such that the transmission or primary reception on band N78 is switched between any two antennas, such as antenna 1 and antenna 3. The second subscriber (SIM2), which is associated with a lower priority, may be blanked with regard to SIM2's transmission or primary reception path to protect s transmit PA and receive LNA (not shown) and to protect the cross-switch 1005 in association with the switching operations initiated by SIM1.

For example, SIM1, which is associated with a highest priority, reconfigures SIM1's N78 band transmission or PRX from Ant-1 to Ant-3 for transmit antenna switched diversity or SRS antenna switching. SIM2's N79 band transmission or primary reception, which is associated with a lowest priority relative to SIM1, may be blanked to protect SIM2's N79 band PA, LNA and/or cross-switch when s N78 band transmission is switched from Ant-1 to Ant-3. Thus, techniques described herein provide the detection of the need to blank SIM2's transmission or PRX to protect a PA, an LNA and/or a cross-switch.

Operations described in FIGS. 7-10 as being performed by a UE may be performed by a component of the UE, such as a modem controller of the UE, a processor of the UE, a controller/processor of the UE, or the like. In some aspects, the modem controller may have information indicating current and upcoming transmission and reception activity across subscribers.

As indicated above, FIGS. 7-10 are provided as examples. Other examples may differ from what is described with regard to FIGS. 7-10.

It should be noted that the operations described with regard to FIGS. 4-10 can be combined with each other. For example, a UE may include multiple shared components, such as one or more of a cross-switch, an LNA, or a TRX switch. The UE (e.g., a modem controller of the UE) may apply the techniques described with regard to FIGS. 4-10, based at least in part on respective priorities of subscribers of the UE, to manage the operation of the multiple shared components to prevent damage and improve utilization of the multiple shared components. For example, there may be TRX switches and antenna switches or cross-switches that are both being shared across the mobile DSDA subscribers. The techniques described herein can be performed in a cascaded manner involving one or more TRX switches and one or more antenna switches that are shared across the DSDA subscriber.

FIG. 11 is a diagram illustrating an example process 1100 performed, for example, by a UE, in accordance with the present disclosure. Example process 1100 is an example where the UE (e.g., UE 120) performs operations associated with protecting RFFE components.

As shown in FIG. 11, in some aspects, process 1100 may include establishing a first communication having a first priority, wherein the first communication is associated with a first subscriber in a connected mode (block 1110). For example, the UE (e.g., using establishment component 1508, depicted in FIG. 15) may establish a first communication having a first priority, wherein the first communication is associated with a first subscriber in a connected mode, as described above.

As further shown in FIG. 11, in some aspects, process 1100 may include establishing a second communication having a second priority, wherein the second communication is associated with a second subscriber in the connected mode (block 1120). For example, the UE (e.g., using establishment component 1508, depicted in FIG. 15) may establish a second communication having a second priority, wherein the second communication is associated with a second subscriber in the connected mode, as described above.

As further shown in FIG. 11, in some aspects, process 1100 may include identifying a state of a TRX switch shared between the first communication and the second communication (block 1130). For example, the UE (e.g., using identification component 1510, depicted in FIG. 15) may identify a state of a TRX switch shared between the first communication and the second communication, as described above.

As further shown in FIG. 11, in some aspects, process 1100 may include performing, based at least in part on the state of the TRX switch, at least one of the first communication or the second communication using a TRX switching configuration (block 1140). For example, the UE (e.g., using modem controller 1512, depicted in FIG. 15) may perform, based at least in part on the state of the TRX switch, at least one of the first communication or the second communication using a TRX switching configuration, as described above.

Process 1100 may include additional aspects, such as any single aspect or any combination of aspects described below and/or in connection with one or more other processes described elsewhere herein.

In a first aspect, the first priority is higher than the second priority, wherein the first communication is a transmission and is ongoing, and wherein the performance of at least one of the first communication or the second communication further comprises preventing the TRX switch from switching to a state associated with the second communication.

In a second aspect, alone or in combination with the first aspect, the first priority is higher than the second priority, wherein the first communication is a reception and is ongoing, and wherein the performance of at least one of the first communication or the second communication further comprises preventing the TRX switch from switching to a state associated with the second communication.

In a third aspect, alone or in combination with one or more of the first and second aspects, the first priority is higher than the second priority, wherein the second communication is a transmission and is ongoing, and wherein the performance of at least one of the first communication or the second communication further comprises blanking the second communication, switching the TRX switch to a state associated with the first communication, and performing the first communication.

In a fourth aspect, alone or in combination with one or more of the first through third aspects, the first priority is higher than the second priority, wherein the second communication is a reception and is ongoing, and wherein the performance of at least one of the first communication or the second communication further comprises blanking the second communication, switching the TRX switch to a state associated with the first communication, and performing the first communication.

In a fifth aspect, alone or in combination with one or more of the first through fourth aspects, the first priority is higher than the second priority, and wherein the performance of at least one of the first communication or the second communication further comprises blanking or postponing the second communication in a slot, wherein the first communication is scheduled for the slot, and performing the first communication in the slot.

In a sixth aspect, alone or in combination with one or more of the first through fifth aspects, the identification of the state of the TRX switch further comprises identifying that the TRX switch is shared between the first communication and the second communication based at least in part on the first communication and the second communication being associated with a same power amplifier.

In a seventh aspect, alone or in combination with one or more of the first through sixth aspects, the TRX switch is associated with switching a front-end antenna path of the UE between the first subscriber and the second subscriber.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 120) performs operations associated with protecting RFFE components.

As shown in FIG. 12, in some aspects, process 1200 may include establishing a first communication associated with a first priority, wherein the first communication is associated with a first subscriber in a connected mode and is ongoing (block 1210). For example, the UE (e.g., using establishment component 1508, depicted in FIG. 15) may establish a first communication associated with a first priority, wherein the first communication is associated with a first subscriber in a connected mode and is ongoing, as described above.

As further shown in FIG. 12, in some aspects, process 1200 may include establishing a second communication associated with a second priority, wherein the second communication is associated with a second subscriber in the connected mode, and wherein the second communication at least partially overlaps the first communication in time (block 1220). For example, the UE (e.g., using establishment component 1508, depicted in FIG. 15) may establish a second communication associated with a second priority, wherein the second communication is associated with a second subscriber in the connected mode, and wherein the second communication at least partially overlaps the first communication in time, as described above.

As further shown in FIG. 12, in some aspects, process 1200 may include identifying an LNA shared between the first communication and the second communication (block 1230). For example, the UE (e.g., using identification component 1510, depicted in FIG. 15) may identify an LNA shared between the first communication and the second communication, as described above.

As further shown in FIG. 12, in some aspects, process 1200 may include performing at least one of the first communication or the second communication using an LNA configuration associated with the LNA being shared (block 1240). For example, the UE (e.g., using modem controller 1512, depicted in FIG. 15) may perform at least one of the first communication or the second communication using an LNA configuration associated with the LNA being shared, as described above.

Process 1200 may include additional aspects, such as any single aspect or any combination of aspects described below and/or in connection with one or more other processes described elsewhere herein.

In a first aspect, the first communication is a transmission and the first priority is higher than the second priority, and wherein performance of at least one of the first communication or the second communication further comprises blanking the second communication.

In a second aspect, alone or in combination with the first aspect, blanking the second communication further comprises triggering a power amplifier or a digital-analog converter of the second communication to blank the second communication.

In a third aspect, alone or in combination with one or more of the first and second aspects, the first communication is a transmission and the first priority is higher than the second priority, and wherein the performance of at least one of the first communication or the second communication further comprises performing at least one of the first communication or the second communication with an input of the LNA terminated at a threshold resistance load.

In a fourth aspect, alone or in combination with one or more of the first through third aspects, the first communication is a transmission and the first priority is higher than the second priority, and wherein the performance of at least one of the first communication or the second communication further comprises performing at least one of the first communication or the second communication using a high impedance mode at the LNA.

In a fifth aspect, alone or in combination with one or more of the first through fourth aspects, the first communication is a transmission and the first priority is higher than the second priority, and wherein the performance of at least one of the first communication or the second communication further comprises performing at least one of the first communication or the second communication with the LNA terminated to ground.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
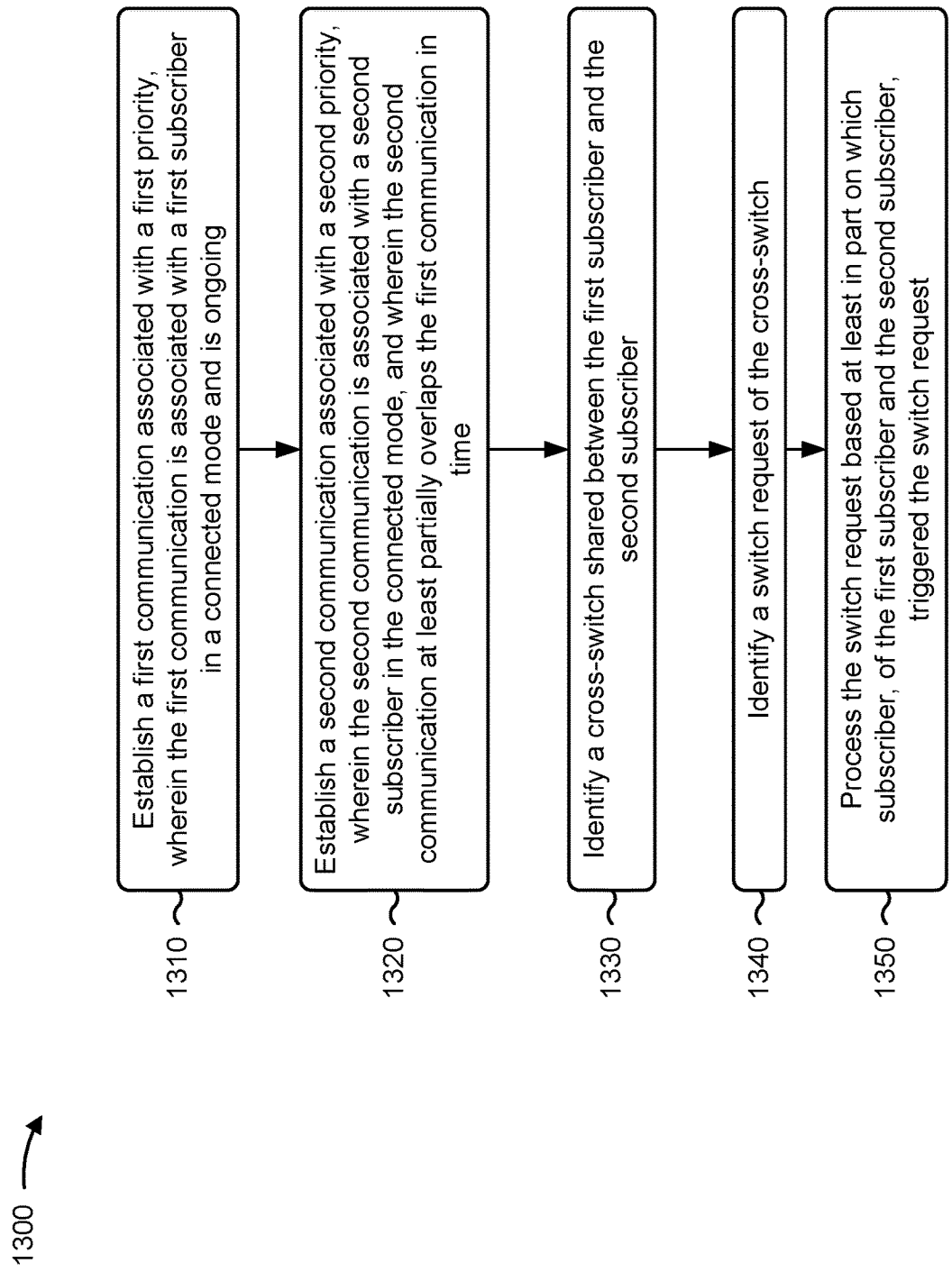

FIG. 13 is a diagram illustrating an example process 1300 performed, for example, by a UE, in accordance with the present disclosure. Example process 1300 is an example where the UE (e.g., UE 120) performs operations associated with protecting RFFE components.

As shown in FIG. 13, in some aspects, process 1300 may include establishing a first communication associated with a first priority, wherein the first communication is associated with a first subscriber in a connected mode and is ongoing (block 1310). For example, the UE (e.g., using establishment component 1508, depicted in FIG. 15) may establish a first communication associated with a first priority, wherein the first communication is associated with a first subscriber in a connected mode and is ongoing, as described above.

As further shown in FIG. 13, in some aspects, process 1300 may include establishing a second communication associated with a second priority, wherein the second communication is associated with a second subscriber in the connected mode, wherein the first priority is higher than the second priority (block 1320). For example, the UE (e.g., using establishment component 1508, depicted in FIG. 15) may establish a second communication associated with a second priority, wherein the second communication is associated with a second subscriber in the connected mode, wherein the first priority is higher than the second priority, as described above.

As further shown in FIG. 13, in some aspects, process 1300 may include identifying a cross-switch shared between the first subscriber and the second subscriber (block 1330). For example, the UE (e.g., using identification component 1510, depicted in FIG. 15) may identify a cross-switch shared between the first subscriber and the second subscriber, as described above.

As further shown in FIG. 13, in some aspects, process 1300 may include identifying a switch request of the cross-switch (block 1340). For example, the UE (e.g., using identification component 1510, depicted in FIG. 15) may identify a switch request of the cross-switch, as described above.

As further shown in FIG. 13, in some aspects, process 1300 may include processing the switch request based at least in part on which subscriber, of the first subscriber and the second subscriber, triggered the switch request (block 1350). For example, the UE (e.g., using modem controller 1512, depicted in FIG. 15) may process the switch request based at least in part on which subscriber, of the first subscriber and the second subscriber, triggered the switch request, as described above.

Process 1300 may include additional aspects, such as any single aspect or any combination of aspects described below and/or in connection with one or more other processes described elsewhere herein.

In a first aspect, the switch request is triggered by the first subscriber, and wherein processing the switch request further comprises switching the cross-switch in accordance with the switch request and blanking the second communication.

In a second aspect, alone or in combination with the first aspect, the switch request is associated with an antenna-switched diversity configuration.

In a third aspect, alone or in combination with one or more of the first and second aspects, the switch request is associated with a sounding reference signal antenna switching configuration.

In a fourth aspect, alone or in combination with one or more of the first through third aspects, the switch request is triggered by the second subscriber, and wherein processing the switch request further comprises postponing a switch of the cross-switch until the first communication is completed, and performing the switch after the first communication is completed.

In a fifth aspect, alone or in combination with one or more of the first through fourth aspects, the switch request is triggered by the second subscriber, and wherein processing the switch request further comprises canceling a switch of the cross-switch based at least in part on the switch impacting the first communication.

In a sixth aspect, alone or in combination with one or more of the first through fifth aspects, the switch request is triggered by the second subscriber, and wherein processing the switch request further comprises performing a switch of the cross-switch based at least in part on a determination that the switch can be performed without impacting the first communication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
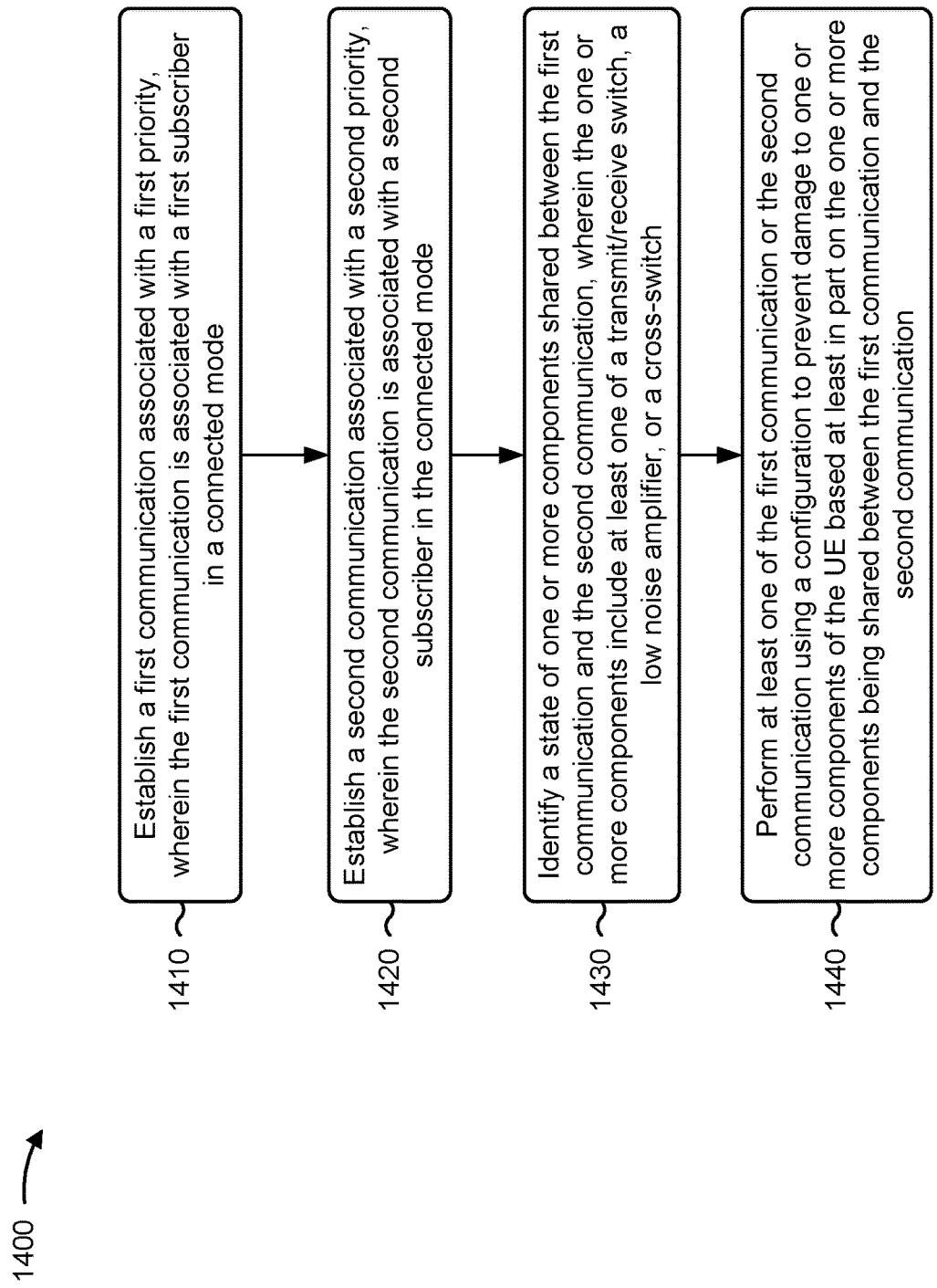

FIG. 14 is a diagram illustrating an example process 1400 performed, for example, by a UE, in accordance with the present disclosure. Example process 1400 is an example where the UE (e.g., UE 120) performs operations associated with protecting RFFE components.

As shown in FIG. 14, in some aspects, process 1400 may include establishing a first communication associated with a first priority, wherein the first communication is associated with a first subscriber in a connected mode (block 1410). For example, the UE (e.g., using establishment component 1508, depicted in FIG. 15) may establish a first communication associated with a first priority, wherein the first communication is associated with a first subscriber in a connected mode, as described above.

As further shown in FIG. 14, in some aspects, process 1400 may include establishing a second communication associated with a second priority, wherein the second communication is associated with a second subscriber in the connected mode (block 1420). For example, the UE (e.g., using establishment component 1508, depicted in FIG. 15) may establish a second communication associated with a second priority, wherein the second communication is associated with a second subscriber in the connected mode, as described above.

As further shown in FIG. 14, in some aspects, process 1400 may include identifying one or more components shared between the first communication and the second communication, wherein the one or more components are included in a radio frequency front-end (RFFE) of the UE, are switchable between the first subscriber and the second subscriber, and include at least one of: a transmit/receive switch, a low noise amplifier, or a cross-switch (block 1430). For example, the UE (e.g., using identification component 1510, depicted in FIG. 15) may identify one or more components shared between the first communication and the second communication, wherein the one or more components include at least one of: a transmit/receive switch, a low noise amplifier, or a cross-switch, as described above. The one or more components may be included in an RFFE of the UE. The one or more components may be switchable between the first subscriber (e.g., a state associated with the first communication) and the second subscriber (e.g., a state associated with the second communication. In some aspects, the UE may identify a state of the one or more components.

As further shown in FIG. 14, in some aspects, process 1400 may include performing at least one of the first communication or the second communication using a configuration to prevent damage to the one or more components of the UE based at least in part on the one or more components being shared between the first communication and the second communication (block 1440). For example, the UE (e.g., using modem controller 1512, depicted in FIG. 15) may perform at least one of the first communication or the second communication using a configuration to prevent damage to the one or more components of the UE based at least in part on the one or more components being shared between the first communication and the second communication, as described above.

In a first aspect, the first priority is higher than the second priority, wherein the first communication is ongoing, and wherein the performance of at least one of the first communication or the second communication using the configuration to prevent damage to the one or more components further comprises preventing the TRX switch from switching to a state associated with the second communication.

In a second aspect, alone or in combination with the first aspect, the first priority is higher than the second priority, wherein the second communication is ongoing, and wherein the performance of at least one of the first communication or the second communication using the configuration to prevent damage to the one or more components further comprises blanking the second communication, switching the TRX switch to a state associated with the first communication, and performing the first communication.

In a third aspect, alone or in combination with one or more of the first and second aspects, the first priority is higher than the second priority, and wherein the performance of at least one of the first communication or the second communication using the configuration to prevent damage to the one or more components further comprises blanking or postponing the second communication in a slot, wherein the first communication is scheduled for the slot, and performing the first communication in the slot.

In a fourth aspect, alone or in combination with one or more of the first through third aspects, blanking the second communication further comprises triggering a power amplifier or a digital-analog converter of the second communication to blank the second communication.

In a fifth aspect, alone or in combination with one or more of the first through fourth aspects, the identification of the one or more components further comprises identifying that the TRX switch is shared between the first communication and the second communication based at least in part on the first communication and the second communication being associated with a same power amplifier.

In a sixth aspect, alone or in combination with one or more of the first through fifth aspects, the TRX switch is associated with switching a front-end antenna path of the UE between the first subscriber and the second subscriber.

In a seventh aspect, alone or in combination with one or more of the first through sixth aspects, the first communication is a transmission and the first priority is higher than the second priority, and wherein the performance of at least one of the first communication or the second communication using the configuration to prevent damage to the one or more components further comprises performing at least one of the first communication or the second communication with an input of the LNA terminated at a threshold resistance load.

In an eighth aspect, alone or in combination with one or more of the first through seventh aspects, the first communication is a transmission and the first priority is higher than the second priority, and wherein the performance of at least one of the first communication or the second communication using the configuration to prevent damage to the one or more components further comprises performing at least one of the first communication or the second communication using a high impedance mode at the LNA.

In a ninth aspect, alone or in combination with one or more of the first through eighth aspects, the first communication is a transmission and the first priority is higher than the second priority, and wherein the performance of at least one of the first communication or the second communication using the configuration to prevent damage to the one or more components further comprises performing at least one of the first communication or the second communication with the LNA terminated to ground.

In a tenth aspect, alone or in combination with one or more of the first through ninth aspects, process 1400 includes identifying a switch request of the cross-switch, wherein performing at least one of the first communication or the second communication using the configuration to prevent damage to the one or more components is based at least in part on which subscriber, of the first subscriber and the second subscriber, triggered the switch request.

In an eleventh aspect, alone or in combination with one or more of the first through tenth aspects, the switch request is triggered by the first subscriber, and wherein performing at least one of the first communication or the second communication using the configuration to prevent damage to the one or more components further comprises performing an antenna switch reconfiguration of the cross-switch in accordance with the switch request, and blanking the second communication.

In a twelfth aspect, alone or in combination with one or more of the first through eleventh aspects, the switch request is associated with an antenna-switched diversity configuration or a sounding reference signal antenna switching configuration.

In a thirteenth aspect, alone or in combination with one or more of the first through twelfth aspects, the switch request is triggered by the second subscriber, and wherein performing at least one of the first communication or the second communication using the configuration to prevent damage to the one or more components further comprises postponing an antenna switch reconfiguration of the cross-switch until the first communication is completed, and performing the antenna switch reconfiguration after the first communication is completed.

In a fourteenth aspect, alone or in combination with one or more of the first through thirteenth aspects, the switch request is triggered by the second subscriber, and wherein performing at least one of the first communication or the second communication using the configuration to prevent damage to the one or more components further comprises canceling an antenna switch reconfiguration of the cross-switch based at least in part on the antenna switch reconfiguration impacting the first communication.

In a fifteenth aspect, alone or in combination with one or more of the first through fourteenth aspects, the switch request is triggered by the second subscriber, and wherein performing at least one of the first communication or the second communication using the configuration to prevent damage to the one or more components further comprises performing a switch of the cross-switch based at least in part on a determination that the switch can be performed without impacting the first communication.

In a sixteenth aspect, alone or in combination with one or more of the first through fifteenth aspects, identifying the one or more components comprises identifying a state of the one or more components.

Process 1400 may include additional aspects, such as any single aspect or any combination of aspects described in connection with process 1100, process 1200, and/or process 1300. Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
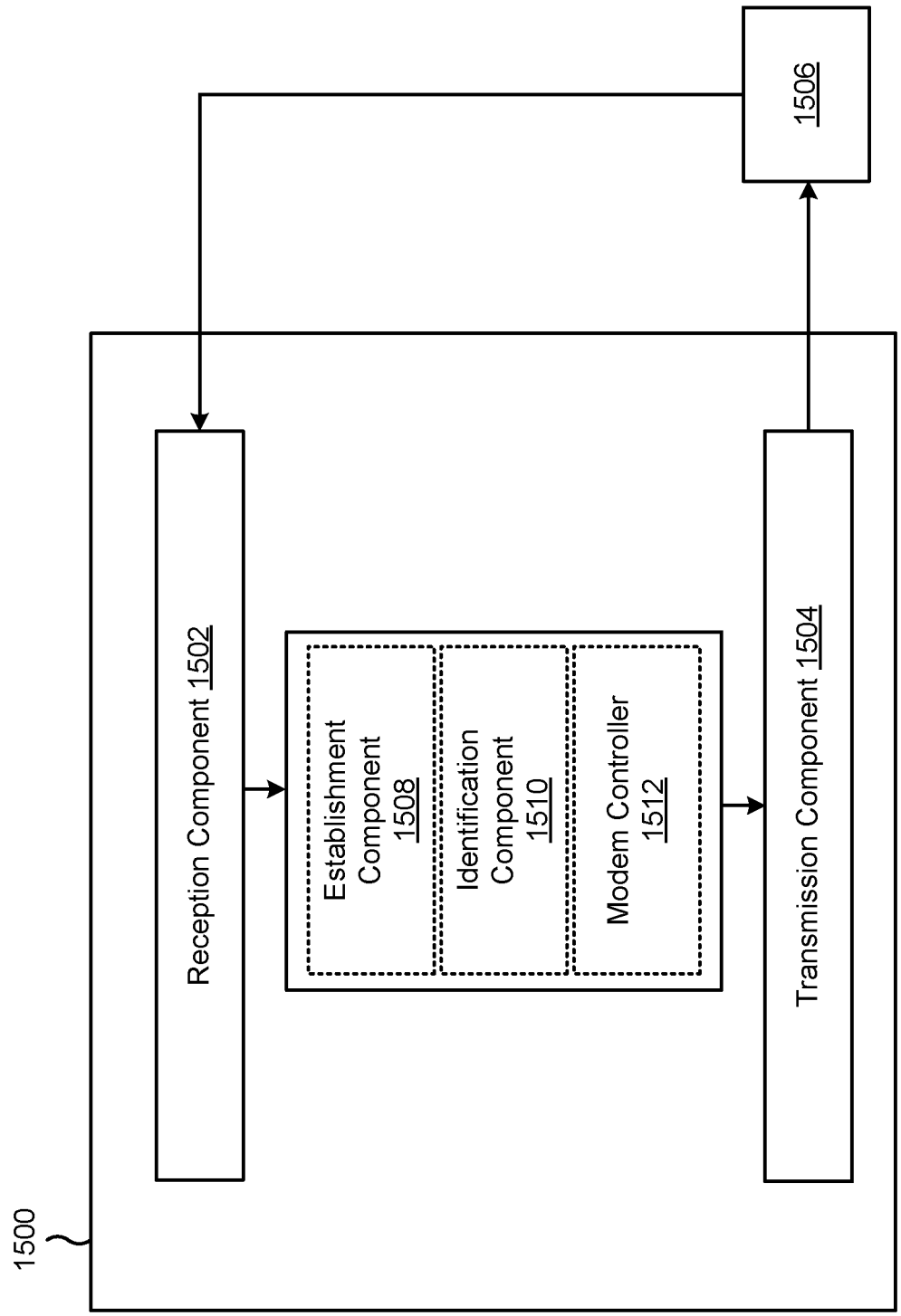
FIG. 15 is a block diagram of an example apparatus for wireless communication, in accordance with the present disclosure.

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 includes one or more of an establishment component 1508, an identification component 1510, or a modem controller 1512, among other examples.

In some aspects, the apparatus 1500 may be configured to perform one or more operations described herein in connection with FIGS. 3-10. Additionally, or alternatively, the apparatus 1500 may be configured to perform one or more processes described herein, such as process 1100 of FIG. 11, process 1200 of FIG. 12, process 1300 of FIG. 13, process 1400 of FIG. 14, or a combination thereof. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The establishment component 1508 may establish a first communication having a first priority, wherein the first communication is associated with a first subscriber in a connected mode. The establishment component 1508 may establish a second communication having a second priority, wherein the second communication is associated with a second subscriber in the connected mode. The identification component 1510 may identify a state of a TRX switch shared between the first communication and the second communication. The modem controller 1512 may perform, based at least in part on the state of the TRX switch, at least one of the first communication or the second communication using a TRX switching configuration.

The establishment component 1508 may establish a first communication associated with a first priority, wherein the first communication is associated with a first subscriber in a connected mode and is ongoing. The establishment component 1508 may establish a second communication associated with a second priority, wherein the second communication is associated with a second subscriber in the connected mode, and wherein the second communication at least partially overlaps the first communication in time. The identification component 1510 may identify a LNA shared between the first communication and the second communication. The modem controller 1512 may perform at least one of the first communication or the second communication using an LNA configuration associated with the LNA being shared.

The establishment component 1508 may establish a first communication associated with a first priority, wherein the first communication is associated with a first subscriber in a connected mode and is ongoing. The establishment component 1508 may establish a second communication associated with a second priority, wherein the second communication is associated with a second subscriber in the connected mode, wherein the first priority is higher than the second priority. The identification component 1510 may identify a cross-switch shared between the first subscriber and the second subscriber. The identification component 1510 may identify a switch request of the cross-switch. The modem controller 1512 may process the switch request based at least in part on which subscriber, of the first subscriber and the second subscriber, triggered the switch request.

The establishment component 1508 may establish a first communication associated with a first priority, wherein the first communication is associated with a first subscriber in a connected mode. The establishment component 1508 may establish a second communication associated with a second priority, wherein the second communication is associated with a second subscriber in the connected mode. The identification component 1510 may identify a state of one or more components shared between the first communication and the second communication, wherein the one or more components include at least one of a transmit/receive switch, a low noise amplifier, or a cross-switch. The modem controller 1512 may perform at least one of the first communication or the second communication using a configuration to prevent damage to one or more components of the UE based at least in part on the one or more components being shared between the first communication and the second communication.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: establishing a first communication having a first priority, wherein the first communication is associated with a first subscriber in a connected mode; establishing a second communication having a second priority, wherein the second communication is associated with a second subscriber in the connected mode; identifying a state of a transmit/receive (TRX) switch shared between the first communication and the second communication; and performing, based at least in part on the state of the TRX switch, at least one of the first communication or the second communication using a TRX switching configuration.

Aspect 2: The method of Aspect 1, wherein the first priority is higher than the second priority, wherein the first communication is a transmission and is ongoing, and wherein the performance of at least one of the first communication or the second communication further comprises: preventing the TRX switch from switching to a state associated with the second communication.

Aspect 3: The method of Aspect 1, wherein the first priority is higher than the second priority, wherein the first communication is a reception and is ongoing, and wherein the performance of at least one of the first communication or the second communication further comprises: preventing the TRX switch from switching to a state associated with the second communication.

Aspect 4: The method of Aspect 1, wherein the first priority is higher than the second priority, wherein the second communication is a transmission and is ongoing, and wherein the performance of at least one of the first communication or the second communication further comprises: blanking the second communication; switching the TRX switch to a state associated with the first communication; and performing the first communication.

Aspect 5: The method of Aspect 1, wherein the first priority is higher than the second priority, wherein the second communication is a reception and is ongoing, and wherein the performance of at least one of the first communication or the second communication further comprises: blanking the second communication; switching the TRX switch to a state associated with the first communication; and performing the first communication.

Aspect 6: The method of Aspect 1, wherein the first priority is higher than the second priority, and wherein the performance of at least one of the first communication or the second communication further comprises: blanking or postponing the second communication in a slot, wherein the first communication is scheduled for the slot; and performing the first communication in the slot.

Aspect 7: The method of Aspect 1, wherein the identification of the state of the TRX switch further comprises: identifying that the TRX switch is shared between the first communication and the second communication based at least in part on the first communication and the second communication being associated with a same power amplifier.

Aspect 8: The method of Aspect 1, wherein the TRX switch is associated with switching a front-end antenna path of the UE between the first subscriber and the second subscriber.

Aspect 9: A method of wireless communication performed by a user equipment (UE), comprising: establishing a first communication associated with a first priority, wherein the first communication is associated with a first subscriber in a connected mode and is ongoing; establishing a second communication associated with a second priority, wherein the second communication is associated with a second subscriber in the connected mode, and wherein the second communication at least partially overlaps the first communication in time; identifying a low noise amplifier (LNA) shared between the first communication and the second communication; and performing at least one of the first communication or the second communication using an LNA configuration associated with the LNA being shared.

Aspect 10: The method of Aspect 9, wherein the first communication is a transmission and the first priority is higher than the second priority, and wherein performance of at least one of the first communication or the second communication further comprises: blanking the second communication.

Aspect 11: The method of Aspect 10, wherein blanking the second communication further comprises triggering a power amplifier or a digital-analog converter of the second communication to blank the second communication.

Aspect 12: The method of Aspect 9, wherein the first communication is a transmission and the first priority is higher than the second priority, and wherein the performance of at least one of the first communication or the second communication further comprises: performing at least one of the first communication or the second communication with an input of the LNA terminated at a threshold resistance load.

Aspect 13: The method of Aspect 9, wherein the first communication is a transmission and the first priority is higher than the second priority, and wherein the performance of at least one of the first communication or the second communication further comprises: performing at least one of the first communication or the second communication using a high impedance mode at the LNA.

Aspect 14: The method of Aspect 9, wherein the first communication is a transmission and the first priority is higher than the second priority, and wherein the performance of at least one of the first communication or the second communication further comprises: performing at least one of the first communication or the second communication with the LNA terminated to ground.

Aspect 15: A method of wireless communication performed by a user equipment (UE), comprising: establishing a first communication associated with a first priority, wherein the first communication is associated with a first subscriber in a connected mode and is ongoing; establishing a second communication associated with a second priority, wherein the second communication is associated with a second subscriber in the connected mode, wherein the first priority is higher than the second priority; identifying a cross-switch shared between the first subscriber and the second subscriber; identifying a switch request of the cross-switch; and processing the switch request based at least in part on which subscriber, of the first subscriber and the second subscriber, triggered the switch request.

Aspect 16: The method of Aspect 15, wherein the switch request is triggered by the first subscriber, and wherein processing the switch request further comprises: switching the cross-switch in accordance with the switch request; and blanking the second communication.

Aspect 17: The method of Aspect 15, wherein the switch request is associated with an antenna-switched diversity configuration.

Aspect 18: The method of Aspect 15, wherein the switch request is associated with a sounding reference signal antenna switching configuration.

Aspect 19: The method of Aspect 15, wherein the switch request is triggered by the second subscriber, and wherein processing the switch request further comprises: postponing a switch of the cross-switch until the first communication is completed; and performing the switch after the first communication is completed.

Aspect 20: The method of Aspect 15, wherein the switch request is triggered by the second subscriber, and wherein processing the switch request further comprises: canceling a switch of the cross-switch based at least in part on the switch impacting the first communication.

Aspect 21: The method of Aspect 15, wherein the switch request is triggered by the second subscriber, and wherein processing the switch request further comprises: performing a switch of the cross-switch based at least in part on a determination that the switch can be performed without impacting the first communication.

Aspect 22: A method of wireless communication performed by a user equipment (UE), comprising: establishing a first communication associated with a first priority, wherein the first communication is associated with a first subscriber in a connected mode; establishing a second communication associated with a second priority, wherein the second communication is associated with a second subscriber in the connected mode; identifying a state of one or more components shared between the first communication and the second communication, wherein the one or more components include at least one of: a transmit/receive switch, a low noise amplifier, or a cross-switch; and performing at least one of the first communication or the second communication using a configuration to prevent damage to one or more components of the UE based at least in part on the one or more components being shared between the first communication and the second communication.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the memory and the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   establish a first communication associated with a first priority, wherein the first communication is associated with a first subscriber in a connected mode, the first communication is ongoing;

establish a second communication associated with a second priority, wherein the second communication is associated with a second subscriber in the connected mode, the first priority is higher than the second priority;

identify one or more components shared between the first communication and the second communication, wherein the one or more components are included in a radio frequency front-end (RFFE) of the UE, are switchable between the first subscriber and the second subscriber, and include at least one of:
a transmit/receive (TRX) switch,
a low noise amplifier (LNA), or
a cross-switch; and perform at least one of the first communication or the second communication using a configuration to prevent damage to the one or more components of the UE based at least in part on the one or more components being shared between the first communication and the second communication, wherein perform at least one of the first communication or the second communication using the configuration to prevent damage to the one or more components comprises:
prevent the TRX switch from switching to a state associated with the second communication.

2. The UE of claim 1, wherein the second communication is ongoing, and wherein, to perform at least one of the first communication or the second communication using the configuration to prevent damage to the one or more components, the one or more processors are configured to:
blank the second communication;
switch the TRX switch to a state associated with the first communication; and
perform the first communication.

3. The UE of claim 1, wherein, to perform at least one of the first communication or the second communication using the configuration to prevent damage to the one or more components, the one or more processors are configured to:
blank or postponing the second communication in a slot, wherein the first communication is scheduled for the slot; and
perform the first communication in the slot.

4. The UE of claim 3, wherein the one or more processors, to blank the second communication, are configured to trigger a power amplifier or a digital-analog converter of the second communication to blank the second communication.

5. The UE of claim 1, wherein, to identify the one or more components, the one or more processors are configured to:
identify that the TRX switch is shared between the first communication and the second communication based at least in part on the first communication and the second communication being associated with a same power amplifier.

6. The UE of claim 1, wherein the TRX switch is associated with switching a front-end antenna path of the UE between the first subscriber and the second subscriber.

7. The UE of claim 1, wherein the first communication is a transmission, and wherein, to perform at least one of the first communication or the second communication using the configuration to prevent damage to the one or more components, the one or more processors are configured to:
perform at least one of the first communication or the second communication with an input of the LNA terminated at a threshold resistance load.

8. The UE of claim 1, wherein the first communication is a transmission, and wherein, to perform at least one of the first communication or the second communication using the configuration to prevent damage to the one or more components, the one or more processors are configured to:
perform at least one of the first communication or the second communication using a high impedance mode at the LNA.

9. The UE of claim 1, wherein the first communication is a transmission, and wherein, to perform at least one of the first communication or the second communication using the configuration to prevent damage to the one or more components, the one or more processors are configured to:
perform at least one of the first communication or the second communication with the LNA terminated to ground.

10. The UE of claim 1, wherein the one or more processors are further configured to:
identify a switch request of the cross-switch, wherein performing at least one of the first communication or the second communication using the configuration to prevent damage to the one or more components is based at least in part on which subscriber, of the first subscriber and the second subscriber, triggered the switch request.

11. The UE of claim 10, wherein the switch request is triggered by the first subscriber, and wherein, to perform at least one of the first communication or the second communication using the configuration to prevent damage to the one or more components, the one or more processors are configured to:
perform an antenna switch reconfiguration of the cross-switch in accordance with the switch request; and
blank the second communication.

12. The UE of claim 10, wherein the switch request is associated with an antenna-switched diversity configuration or a sounding reference signal antenna switching configuration.

13. The UE of claim 10, wherein the switch request is triggered by the second subscriber, and wherein, to perform at least one of the first communication or the second communication using the configuration to prevent damage to the one or more components, the one or more processors are configured to:
postpone an antenna switch reconfiguration of the cross-switch until the first communication is completed; and
perform the antenna switch reconfiguration after the first communication is completed.

14. The UE of claim 10, wherein the switch request is triggered by the second subscriber, and wherein, to perform at least one of the first communication or the second communication using the configuration to prevent damage to the one or more components, the one or more processors are configured to:
cancel an antenna switch reconfiguration of the cross-switch based at least in part on the antenna switch reconfiguration impacting the first communication.

15. The UE of claim 10, wherein the switch request is triggered by the second subscriber, and wherein, to perform at least one of the first communication or the second communication using the configuration to prevent damage to the one or more components, the one or more processors are configured to:
perform a switch of the cross-switch based at least in part on a determination that the switch can be performed without impacting the first communication.

16. The UE of claim 1, wherein the one or more processors, to identify the one or more components, are configured to identify a state of the one or more components.

17. A method of wireless communication performed by a user equipment (UE), comprising:
  establishing a first communication associated with a first priority, wherein the first communication is associated with a first subscriber in a connected mode, the first communication is ongoing;
  establishing a second communication associated with a second priority, wherein the second communication is associated with a second subscriber in the connected mode, the first priority is higher than the second priority;
  identifying one or more components shared between the first communication and the second communication, wherein the one or more components are included in a radio frequency front-end (RFFE) of the UE, are switchable between the first subscriber and the second subscriber, and include at least one of:
    a transmit/receive (TRX) switch,
    a low noise amplifier (LNA), or
    a cross-switch; and
  performing at least one of the first communication or the second communication using a configuration to prevent damage to the one or more components of the UE based at least in part on the one or more components being shared between the first communication and the second communication, wherein performing of at least one of the first communication or the second communication using the configuration to prevent damage to the one or more components comprises:
    preventing the TRX switch from switching to a state associated with the second communication.

18. The method of claim 17, wherein the second communication is ongoing, and wherein the performance of at least one of the first communication or the second communication using the configuration to prevent damage to the one or more components further comprises:
  blanking the second communication;
  switching the TRX switch to a state associated with the first communication; and
  performing the first communication.

19. The method of claim 17, wherein the performance of at least one of the first communication or the second communication using the configuration to prevent damage to the one or more components further comprises:
  blanking or postponing the second communication in a slot, wherein the first communication is scheduled for the slot; and
  performing the first communication in the slot.

20. The method of claim 17, wherein the identification of the one or more components further comprises:
  identifying that the TRX switch is shared between the first communication and the second communication based at least in part on the first communication and the second communication being associated with a same power amplifier.

21. The method of claim 17, wherein the first communication is a transmission, and wherein the performance of at least one of the first communication or the second communication using the configuration to prevent damage to the one or more components further comprises:
  performing at least one of the first communication or the second communication with an input of the LNA terminated at a threshold resistance load.

22. The method of claim 17, wherein the first communication is a transmission, and wherein the performance of at least one of the first communication or the second communication using the configuration to prevent damage to the one or more components further comprises:
  performing at least one of the first communication or the second communication using a high impedance mode at the LNA.

23. The method of claim 17, wherein the first communication is a transmission, and wherein the performance of at least one of the first communication or the second communication using the configuration to prevent damage to the one or more components further comprises:
  performing at least one of the first communication or the second communication with the LNA terminated to ground.

24. The method of claim 17, further comprising:
  identifying a switch request of the cross-switch, wherein performing at least one of the first communication or the second communication using the configuration to prevent damage to the one or more components is based at least in part on which subscriber, of the first subscriber and the second subscriber, triggered the switch request.

25. A non-transitory computer-readable medium storing a set of instructions for wireless communication, the set of instructions comprising:
  one or more instructions that, when executed by one or more processors of a user equipment (UE), cause the UE to:
    establish a first communication associated with a first priority, wherein the first communication is associated with a first subscriber in a connected mode, the first communication is ongoing;
    establish a second communication associated with a second priority, wherein the second communication is associated with a second subscriber in the connected mode, the first priority is higher than the second priority;
    identify one or more components shared between the first communication and the second communication, wherein the one or more components are included in a radio frequency front-end (RFFE) of the UE, are switchable between the first subscriber and the second subscriber, and include at least one of:
      a transmit/receive (TRX) switch,
      a low noise amplifier (LNA), or
      a cross-switch; and
    perform at least one of the first communication or the second communication using a configuration to prevent damage to the one or more components of the UE based at least in part on the one or more components being shared between the first communication and the second communication, wherein perform of at least one of the first communication or the second communication using the configuration to prevent damage to the one or more components comprises:
      prevent the TRX switch from switching to a state associated with the second communication.

26. An apparatus for wireless communication, comprising:
  means for establishing a first communication associated with a first priority, wherein the first communication is associated with a first subscriber in a connected mode, the first communication is ongoing;

means for establishing a second communication associated with a second priority, wherein the second communication is associated with a second subscriber in the connected mode, the first priority is higher than the second priority;

means for identifying one or more components shared between the first communication and the second communication, wherein the one or more components are included in a radio frequency front-end (RFFE) of the apparatus, are switchable between the first subscriber and the second subscriber, and include at least one of:
a transmit/receive (TRX) switch,
a low noise amplifier (LNA), or
a cross-switch; and means for performing at least one of the first communication or the second communication using a configuration to prevent damage to the one or more components of the UE based at least in part on the one or more components being shared between the first communication and the second communication, wherein the means for performing of at least one of the first communication or the second communication using the configuration to prevent damage to the one or more components further comprises:
means for preventing the TRX switch from switching to a state associated with the second communication.

\* \* \* \* \*